(12) United States Patent
Huang et al.

(10) Patent No.: US 11,543,627 B2
(45) Date of Patent: Jan. 3, 2023

(54) OPTICAL IMAGING LENS ASSEMBLY

(71) Applicant: Zhejiang Sunny Optical Co., Ltd, Ningbo (CN)

(72) Inventors: Lin Huang, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 301 days.

(21) Appl. No.: 15/930,991

(22) Filed: May 13, 2020

(65) Prior Publication Data
US 2020/0363611 A1 Nov. 19, 2020

(30) Foreign Application Priority Data
May 16, 2019 (CN) .......................... 201910406719.8

(51) Int. Cl.
*G02B 13/00* (2006.01)
*G02B 9/64* (2006.01)
*G02B 13/06* (2006.01)
*G02B 27/00* (2006.01)

(52) U.S. Cl.
CPC .......... *G02B 13/0045* (2013.01); *G02B 9/64* (2013.01); *G02B 13/06* (2013.01); *G02B 27/0025* (2013.01)

(58) Field of Classification Search
CPC ...... G02B 13/0045; G02B 9/64; G02B 13/06; G02B 27/0025; G02B 13/18
See application file for complete search history.

(56) References Cited

U.S. PATENT DOCUMENTS

| | | |
|---|---|---|
| 8,830,595 B2 | 9/2014 | Huang |
| 9,103,962 B2 | 8/2015 | Liao et al. |
| 9,400,373 B2 | 7/2016 | Huang |

(Continued)

FOREIGN PATENT DOCUMENTS

| | | |
|---|---|---|
| CN | 102486570 A | 6/2012 |
| CN | 204065534 U | 12/2014 |

(Continued)

OTHER PUBLICATIONS

Office Action dated Jun. 29, 2021 issued by the Indian Patent Office in Indian Application No. 202044020207.

(Continued)

*Primary Examiner* — James C. Jones
(74) *Attorney, Agent, or Firm* — Sughrue Mion, PLLC

(57) ABSTRACT

The present disclosure discloses an optical imaging lens assembly including, sequentially from an object side to an image side along an optical axis, a first lens having a positive refractive power; a second lens having a refractive power; a third lens having a refractive power; a fourth lens having a refractive power, a fifth lens having a refractive power, of which an image-side surface is a concave surface; a sixth lens having a refractive power; and a seventh lens having a negative refractive power. An effective focal length f of the optical imaging lens assembly and half of a maximal field-of-view angle HFOV of the optical imaging lens assembly satisfy: 5.5 mm<tan(HFOV)*f<6.5 mm. The optical imaging lens assembly of the present disclosure has at least one of the advantages of a large imaging plane, a large wide angle, a large aperture and ultra-thinness.

19 Claims, 12 Drawing Sheets

(56) References Cited

U.S. PATENT DOCUMENTS

| | | |
|---|---|---|
| 2009/0052057 A1 | 2/2009 | Lin |
| 2016/0085054 A1 | 3/2016 | Asami |
| 2016/0320593 A1 | 11/2016 | Baik |
| 2016/0320594 A1 | 11/2016 | Baik |
| 2017/0254987 A1 | 9/2017 | Lai et al. |
| 2019/0121090 A1 | 4/2019 | Shi et al. |
| 2020/0341242 A1* | 10/2020 | Tseng .................. G02B 9/64 |

FOREIGN PATENT DOCUMENTS

| | | |
|---|---|---|
| CN | 107621683 A | 1/2018 |
| CN | 107783251 A | 3/2018 |
| CN | 108445611 A | 8/2018 |
| CN | 108535843 A | 9/2018 |
| CN | 108535848 A | 9/2018 |
| CN | 109358416 A | 2/2019 |
| JP | 2015-72403 A | 4/2015 |

OTHER PUBLICATIONS

Office Action dated Jul. 11, 2022 issued by the Chinese Patent Office in Chinese Application No. 202110701159.6.

\* cited by examiner

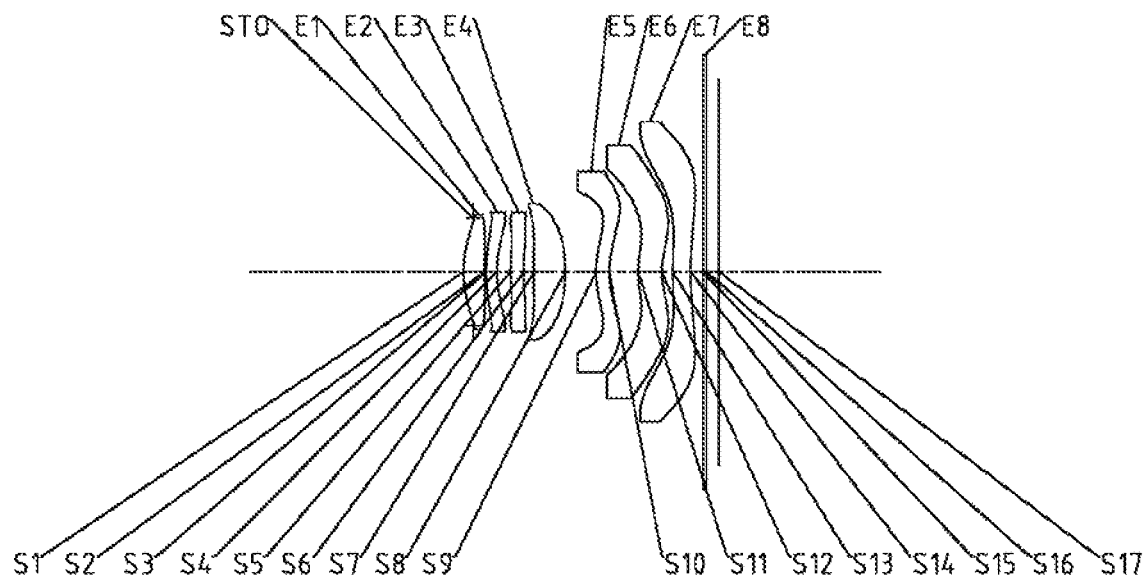
Fig. 9
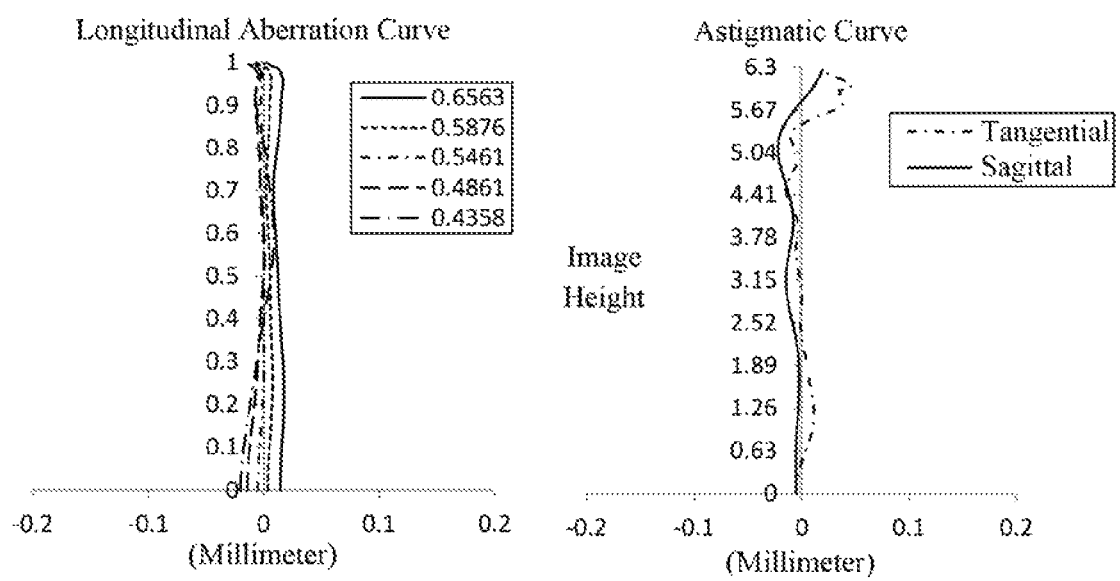
Fig. 10A
Fig. 10B

OPTICAL IMAGING LENS ASSEMBLY

CROSS-REFERENCE TO RELATED APPLICATION

This application claims benefit of priority to Chinese Patent Application No. 201910406719.8 filed on May 16, 2019 before the China National Intellectual Property Administration, the entire disclosure of which is incorporated herein by reference in its entity.

TECHNICAL FIELD

The present disclosure relates to an optical imaging lens assembly, specifically to an optical imaging lens assembly including seven lenses.

BACKGROUND

Recently, with the vigorous development in the field of smartphones, major smartphone manufacturers have more new demands on lens assemblies of the smartphones. Especially in the main camera of high-end flagship models, the imaging lens assemblies of smartphones appear a growing trend toward large imaging plane, large wide angle, large aperture, and ultra-thinness, which causes higher challenges for optical system design.

Compared with the lens assemblies of previous smartphone, the change of these main parameters greatly improves the imaging ability and competitiveness of the lens assemblies of the smartphones. Large imaging plane means higher resolution, large wide angle means larger field-of-view, large aperture means more effective luminous flux and higher signal-to-noise ratio, and ultra-thinness can achieve a better compatibility with smartphones, so that the smartphones are easy to carry. Based on these demand challenges required by smartphone suppliers, the traditional structure with five lenses or six lenses is not enough to effectively meet these challenges, and the optical imaging lens assembly with seven lenses will gradually become the mainstream.

The present disclosure intends to provide an optical imaging lens assembly having seven lenses and with a large imaging plane, a large wide angle, a large aperture, and an ultra-thinness, which can better meet the application requirements of the main camera on the next-generation high-end smartphone.

SUMMARY

The present disclosure provides an optical imaging lens assembly that is applicable to portable electronic products and at least solves or partially addresses at least one of the above disadvantages of the prior art.

The present disclosure provides an optical imaging lens assembly, which includes, sequentially from an object side to an image side along an optical axis: a first lens, having a positive refractive power: a second lens, having a refractive power: a third lens, having a refractive power; a fourth lens, having a refractive power; a fifth lens, having a negative refractive power, of which an image-side surface is a concave surface: a sixth lens, having a refractive power, and a seventh lens, having a negative refractive power.

In one implementation, a distance SAG51 along the optical axis from an intersection of an object-side surface of the fifth lens and the optical axis to an effective radius vertex of the object-side surface of the fifth lens may satisfy −1 mm<SAG51<0.

In one implementation, an effective focal length f of the optical imaging lens assembly and half of a maximal field-of-view angle HFOV of the optical imaging lens assembly may satisfy 5.5 mm<tan(HFOV)*f <6.5 mm.

In one implementation, a distance TTL along the optical axis from an object-side surface of the first lens to an imaging plane of the optical imaging lens assembly and half of a diagonal length ImgH of an effective pixel area on the imaging plane of the optical imaging lens assembly may satisfy TTL/ImgH<1.5.

In one implementation, an effective focal length f of the optical imaging lens assembly and an entrance pupil diameter EPD of the optical imaging lens assembly may satisfy f/EPD<2.

In one implementation, a maximum effective radius DT31 of an object-side surface of the third lens and a maximum effective radius DT71 of an object-side surface of the seventh lens may satisfy 0<DT31/DT71<0.8.

In one implementation, an air interval T45 along the optical axis between the fourth lens and the fifth lens and an air interval T56 along the optical axis between the fifth lens and the sixth lens may satisfy 0.1<T56/T45≤0.95.

In one implementation, a central thickness CT1 of the first lens along the optical axis, a central thickness CT2 of the second lens along the optical axis and a central thickness CT3 of the third lens along the optical axis may satisfy 0<CT2/(CT1+CT3)<0.6.

In one implementation, an effective focal length f of the optical imaging lens assembly and a combined focal length f12 of the first lens and a second lens may satisfy 0.2<f/f12<1.

In one implementation, a radius of curvature R9 of an object-side surface of the fifth lens and a radius of curvature R11 of an object-side surface of the sixth lens may satisfy 0<R11/R9≤0.97.

In one implementation, an effective focal length f of the optical imaging lens assembly, a radius of curvature R1 of an object-side surface of the first lens and a radius of curvature R4 of an image-side surface of the second lens may satisfy 0.7<(R1+R4)/f<1.4.

In one implementation, an effective focal length f1 of the first lens and an effective local length f2 of the second lens may satisfy 0<|f1/f2|<0.8.

In one implementation, a distance TTL along the optical axis from an object-side surface of the first lens to an imaging plane of the optical imaging lens assembly and a sum ΣCT of central thicknesses of the first lens to the seventh lens may satisfy 1.6<TTL/ΣCT<2.4.

In one implementation, a radius of curvature R10 of the image-side surface of the fifth lens and a radius of curvature R14 of an image-side surface of the seventh lens may satisfy 0<R10/R14≤1.

In one implementation, a distance SAG72 along the optical axis from an intersection of an image-side surface of the seventh lens and the optical axis to an effective radius vertex of the image-side surface of the seventh lens may satisfy −2 mm<SAG72≤−1.06 mm.

The present disclosure provides an optical imaging lens assembly which employs seven lenses. By properly disposing half of a maximal field-of-view angle of the optical imaging lens assembly and the effective focal length of the lens assembly as well as the ratio between a distance along the optical axis from an object-side surface of the first lens to an imaging plane of the optical imaging lens assembly and half of a diagonal length of an effective pixel area on an imaging plane of the optical imaging lens assembly, the optical imaging lens assembly described above may have at least one of the advantages of a large imaging plane, a large wide angle, a large aperture and ultra-thinness.

BRIEF DESCRIPTION OF THE DRAWINGS

Other features, purpose and advantages of the present disclosure will become apparent through detailed description of the non-limiting implementations given in conjunction with the accompanying drawings, in the drawings:

FIG. 9 is a schematic structural view of an optical imaging lens assembly according to embodiment 5 of the present disclosure; and FIGS. 10A-10D illustrate a longitudinal aberration curve, an astigmatic curve, a distortion curve and a lateral color curve of the optical imaging lens assembly according to embodiment 5, respectively;

DETAILED DESCRIPTION OF EMBODIMENTS

Figure 1:
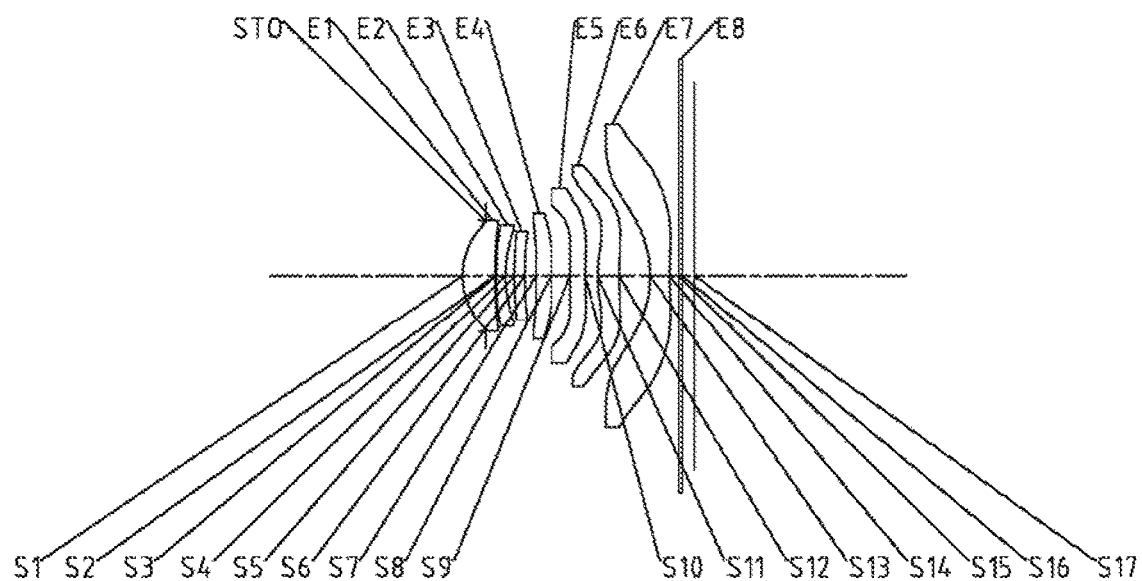
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having," "containing" and/or "contain." when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual clement in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure includes, sequentially from an object side to an image side along an optical axis: a first lens, having a positive refractive power; a second lens, having a refractive power; a third lens, having a refractive power; a fourth lens, having a refractive power; a fifth lens, having a refractive power, and an image-side surface thereof is a concave surface; a sixth lens, having a refractive power, and a seventh lens, having a negative refractive power.

In an exemplary implementation, the second lens may have a negative refractive power, the fourth lens may have a positive refractive power, the fifth lens may have a negative refractive power, and the seventh lens may have a negative refractive power.

In an exemplary implementation, an image-side surface of the first lens may be a concave surface; an object-side surface of the second lens may be a convex surface; and an object-side surface of the third lens may be a convex surface and an image-side surface thereof may be a concave surface.

In an exemplary implementation, a distance SAG51 along the optical axis from an intersection of an object-side surface of the fifth lens and the optical axis to an effective radius vertex of the object-side surface of the fifth lens may satisfy $-1$ mm$<$SAG51$<$0, and more specifically, $-0.91$ mm$\leq$SAG51$\leq-0.25$ mm. By constraining the distance along the optical axis from the intersection of the object-side surface of the fifth lens and the optical axis to the effective radius vertex of the object-side surface of the fifth lens, the imaging effect with a large imaging plane for the imaging lens assembly is achieved, thereby ensuring higher optical performance and better processability.

In an exemplary implementation, an effective focal length f of the optical imaging lens assembly and half of a maximal field-of-view angle HFOV of the optical imaging lens assembly may satisfy 5.5 mm$<$tan(HFOV)*f$<$6.5 mm, and more specifically, 5.71 mm$\leq$tan(HFOV)*f$\leq$6.11 mm. By constraining half of the maximal field-of-view angle of the optical imaging lens assembly and controlling the effective focal length of the optical imaging lens assembly, the imaging effect with a large imaging plane for the imaging lens assembly is achieved, thereby ensuring higher optical performance and better processability.

In an exemplary implementation, a distance TTL along the optical axis from an object-side surface of the first lens to an imaging plane of the optical imaging lens assembly and half of a diagonal length ImgH of an effective pixel area on the imaging plane of the optical imaging lens assembly may satisfy TTL/ImgH$<$1.5, and more specifically, 1.21$\leq$TTL/ImgH$\leq$1.35. By constraining the ratio between the distance along the optical axis from the object-side surface of the first lens to the imaging plane of the optical imaging lens assembly and half of the diagonal length of the effective pixel area on the imaging plane of the optical imaging lens assembly, it is possible to achieve both ultra-thinness and high pixels for the optical imaging lens assembly.

In an exemplary implementation, an effective focal length f of the optical imaging lens assembly and an entrance pupil diameter EPD of the optical imaging lens assembly may satisfy f/EPD$<$2, and more specifically, 1.87$\leq$f/EPD$\leq$1.90. By properly disposing the refractive power and constraining the entrance pupil diameter of the optical imaging lens assembly, the F-number of the optical imaging lens assembly with large image surface will be small, and thus ensuring that the optical imaging lens assembly has a large aperture and a good imaging quality even in a dark environment.

In an exemplary implementation, a maximum effective radius DT31 of an object-side surface of the third lens and a maximum effective radius DT71 of an object-side surface of the seventh lens may satisfy 0$<$DT31/DT71$<$0.8, and more specifically, 0.31$\leq$DT31/DT71$\leq$0.58. By limiting the maximum effective radii of the object-side surfaces of the third lens and the seventh lens, the size of the optical imaging lens assembly can be reduced, thereby the miniaturization of the optical imaging lens assembly will be realized and the resolution of the optical imaging lens assembly will be improved.

In an exemplary implementation, an air interval T45 along the optical axis between the fourth lens and the fifth lens and an air interval T56 along the optical axis between the fifth lens and the sixth lens may satisfy 0.1$<$T56/T45$\leq$0.95, and more specifically, 0.4$\leq$T56/T45$\leq$0.95. By constraining the air interval along the optical axis between the fourth lens and the fifth lens and the air interval along the optical axis between the fifth lens and the sixth lens, the field curvature generated by each lens in the imaging lens assembly can be compensated, so that the optical imaging lens assembly has appropriate field curvature.

In an exemplary implementation, a central thickness CT1 of the first lens along the optical axis, a central thickness CT2 of the second lens along the optical axis and a central thickness CT3 of the third lens along the optical axis may satisfy 0$<$CT2/(CT1+CT3)$<$0.6, and more specifically, 0.21$\leq$CT2/(CT1+CT3)$\leq$0.44. By constraining the ratio between the central thickness of the second lens along the optical axis and the sum of the central thickness of the first lens along the optical axis and the central thickness of the third lens along the optical axis, it is possible to ensure that the optical lens assembly has good processability characteristics, and the spaced distance along the optical axis from the object-side surface to the image-side surface of the first lens is within a certain range.

In an exemplary implementation, an effective focal length f of the optical imaging lens assembly and a combined focal length f12 of the first lens and a second lens may satisfy 0.2$<$f/f12$<$1, and more specifically, 0.49$\leq$f/f12$\leq$0.88. By constraining the ratio between the combined focal length of the first lens and the second lens and the effective focal length of the optical imaging lens assembly, the first lens and the second lens as a whole can be used as a lens group with an appropriate positive refractive power to offset the aberrations generated by the lens with a negative refractive power, thereby obtaining a good imaging quality and achieving the effect of high resolution.

In an exemplary implementation, a radius of curvature R9 of an object-side surface of the fifth lens and a radius of curvature R11 of an object-side surface of the sixth lens may satisfy 0$<$R11/R9$\leq$0.97, and more specifically, 0.3$\leq$R11/R9$\leq$0.97. By properly controlling the ratio between the radius of curvature of the object-side surface of the fifth lens and the radius of curvature of the object-side surface of the sixth lens, the longitudinal aberration generated by the imaging lens assembly can be effectively offset.

In an exemplary implementation, an effective focal length f of the optical imaging lens assembly, a radius of curvature R1 of an object-side surface of the first lens and a radius of curvature R4 of an image-side surface of the second lens may satisfy 0.7$<$(R1+R4)/f$<$1.4, and more specifically, 0.93$\leq$(R1+R4)/f$\leq$1.16. By constraining the radii of curvature of the object-side surface of the first lens and the image-side surface of the second lens, the magnitude of optical distortion can be reduced, and a better imaging quality can be ensured.

In an exemplary implementation, an effective focal length f1 of the first lens and an effective focal length f2 of the second lens may satisfy 0$<$|f1/f2|$<$0.8, and more specifically, 0.30$\leq$|f1/f2|$\leq$0.53. By properly controlling the refractive powers of the first lens and the second lens, the optical sensitivity of the first lens and the second lens will be effectively reduced, which is more beneficial to mass production.

In an exemplary implementation, a distance TTL along the optical axis from an object-side surface of the first lens to an imaging plane of the optical imaging lens assembly and a sum ΣCT of central thicknesses of the first lens to the seventh lens may satisfy 1.6<TTL/ΣCT<2.4, and more specifically, 1.90≤TTL/ΣCT≤2.16. With an appropriate layout for the size, the large aperture and high resolution are realized while the height is reduced and the effect of ultra-thin is achieved.

In an exemplary implementation, a radius of curvature R10 of the image-side surface of the fifth lens and a radius of curvature R14 of an image-side surface of the seventh lens may satisfy 0<R10/R14≤1, and more specifically, 0.20≤R10/R14≤1. By properly controlling the ratio between the radius of curvature of the image-side surface of the fifth lens and the radius of curvature of the image-side surface of the seventh lens, the longitudinal aberration of the optical imaging lens assembly can be effectively offset.

In an exemplary implementation, a distance SAG72 along the optical axis from an intersection of an image-side surface of the seventh lens and the optical axis to an effective radius vertex of the image-side surface of the seventh lens may satisfy −2 mm<SAG72≤−1.06 mm, and more specifically, −1.76 mm≤SAG72≤−1.06 mm. The distance along the optical axis from the intersection of the image-side surface of the seventh lens and the optical axis to the effective radius vertex of the image-side surface of the seventh lens is properly controlled to adjust the chief ray angle of the optical imaging lens assembly, so that the relative brightness of the optical imaging lens assembly will be improved effectively and the image resolution will be increased.

In an implementation of the present disclosure, at least one of the surfaces of each lens is an aspheric surface, that is, at least one of the object-side surface and the image-side surface of each of the first lens, the second lens, the third lens, the fourth lens, the fifth lens, the sixth lens and the seventh lens, is an aspheric surface. The aspheric lens is characterize by a continuous change in curvature from the center to the periphery thereof. Unlike a spherical lens having a constant curvature from the center to the periphery thereof, an aspheric lens has a better characteristics in radius of curvature, and has the advantages of improved distorted aberration and astigmatic aberration. With the aspheric lens, the aberrations that occur during imaging can be eliminated as much as possible, thereby improving the image quality. Alternatively, both the object-side surface and the image-side surface of each of the first lens, the second lens, the third lens, the fourth lens, the fifth lens, the sixth lens, and the seventh lens are aspheric surfaces.

However, the one skilled in the art will understand that the numbers of lenses constituting the optical imaging lens assembly can be changed to obtain the various results and advantages described in the present disclosure without departing from the technical solutions to be protected herein. For example, although seven lenses have been described as an example in the implementations, the optical imaging lens assembly is not limited to including seven lenses. The optical imaging lens assembly may also include other numbers of lenses if desired. Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 1 is a table showing basic parameters of the optical imaging lens assembly in embodiment 1, wherein the units for the radius of curvature, the thickness and the focal length are millimeter (mm).

TABLE 1

| Lens number | Surface number | Surface type | Radius of curvature | Thickness | Material Refractive index | Abbe number | Conic coefficient | Focal length |
|---|---|---|---|---|---|---|---|---|
| | OBJ | spherical | infinite | infinite | | | | |
| | STO | spherical | infinite | −0.5642 | | | | |
| E1 | S1 | aspheric | 2.9841 | 0.8114 | 1.68 | 56.11 | −0.0149 | 6.41 |
| | S2 | aspheric | 18.2182 | 0.0500 | | | −9.1498 | |
| E2 | S3 | aspheric | 4.8961 | 0.3000 | 1.68 | 19.75 | −29.6131 | −15.83 |
| | S4 | aspheric | 3.2815 | 0.4764 | | | −1.1091 | |
| E3 | S5 | aspheric | 16.6055 | 0.5142 | 1.68 | 19.75 | 1.8158 | −27.84 |
| | S6 | aspheric | 8.7326 | 0.2313 | | | 11.4971 | |

TABLE 1-continued

| Lens number | Surface number | Surface type | Radius of curvature | Thickness | Material Refractive index | Abbe number | Conic coefficient | Focal length |
|---|---|---|---|---|---|---|---|---|
| E4 | S7 | aspheric | 10.3440 | 0.8545 | 1.68 | 56.11 | −47.1753 | 10.63 |
|  | S8 | aspheric | −12.8689 | 0.9494 |  |  | 10.6102 |  |
| E5 | S9 | aspheric | 7.3788 | 0.3870 | 1.61 | 28.31 | 16.5392 | −24.27 |
|  | S10 | aspheric | 4.7236 | 0.4056 |  |  | −0.8825 |  |
| E6 | S11 | aspheric | 3.8298 | 0.7806 | 1.68 | 56.11 | −0.4302 | 10.91 |
|  | S12 | aspheric | 7.7155 | 0.8962 |  |  | −19.9017 |  |
| E7 | S13 | aspheric | −4.8735 | 0.6084 | 1.54 | 55.87 | −0.9215 | −6.20 |
|  | S14 | aspheric | 11.0121 | 0.3452 |  |  | 2.6441 |  |
| E8 | S15 | aspheric | infinite | 0.1100 | 1.52 | 64.17 |  |  |
|  | S16 | aspheric | infinite | 0.4000 |  |  |  |  |
|  | S17 | spherical | infinite |  |  |  |  |  |

In the embodiment 1, an effective focal length of the optical imaging lens assembly satisfies f=6.76 mm, a distance along the optical axis from the object-side surface S1 of the first lens E1 to the imaging plane S17 satisfies TTL=8.12 mm, half of a diagonal length of an effective pixel area on the imaging plane S17 satisfies ImgH=6.25 mm, half of a maximal field-of-view of the optical imaging lens assembly satisfies HFOV=41.33°, and a F number satisfies Fno=1.87.

In the embodiment 1, the object-side surface and the image-side surface of any one of the first lens E1 to the seventh lens E7 are aspheric, and the surface shape x of each aspheric lens can be defined by using, but not limited to, thee following aspheric formula:

$$x = \frac{ch^2}{1 + \sqrt{1 - (k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient; and Ai is a correction coefficient for the i-th order of the aspheric surface. Table 2 below shows high-order coefficients $A_4$, $A_8$, $A_{10}$, $A_{12}$, $A_{14}$, $A_{16}$, $A_{18}$ and $A_{20}$ applicable to each aspheric surface S1-S14 in embodiment 1.

Table 2 gives high-order coefficients applicable to each aspheric surface in embodiment 1.

Figures 2A, 2B:
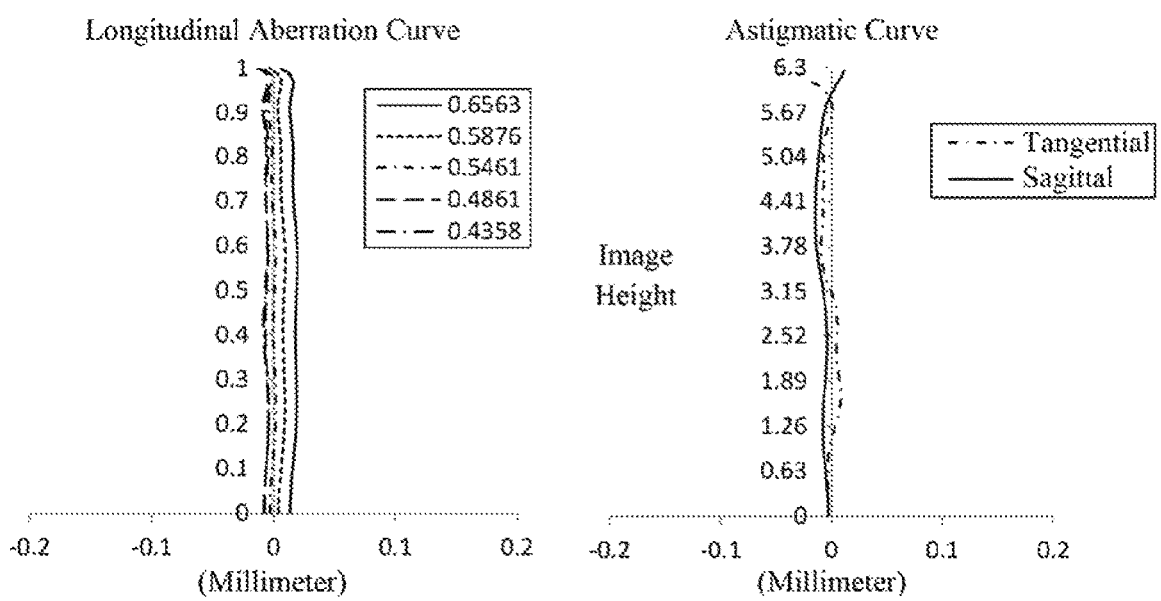
FIGS. 2A-2D illustrate a longitudinal aberration curve, an astigmatic curve, a distortion curve and a lateral color curve of the optical imaging lens assembly according to embodiment 1, respectively.
Figure 2C:
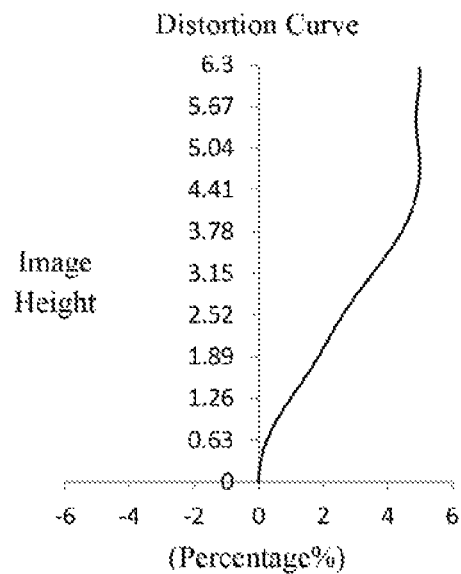
Figure 2D:
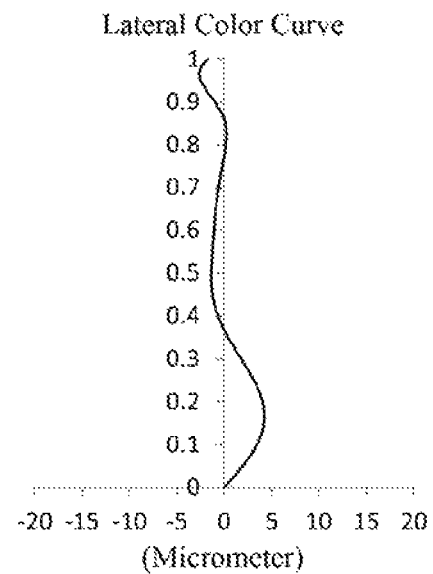

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different field-of-view angles. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve a good imaging quality.

Embodiment 2

Figure 3:
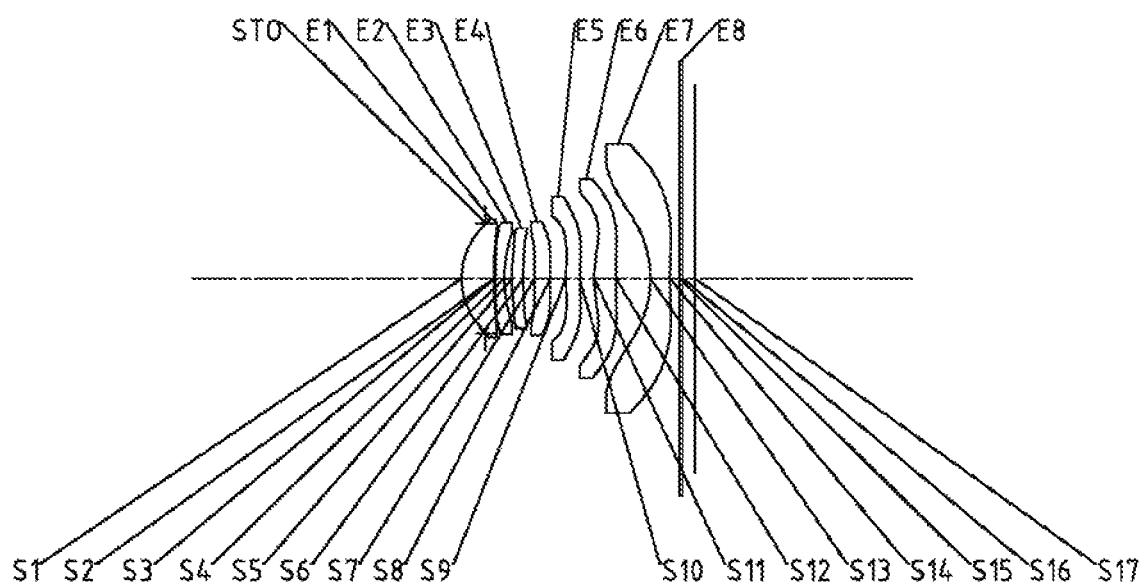
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly includes, sequentially from an object side to an image side along an optical axis: a stop STO, a first lens E1, a second

TABLE 2

| surface number | A4 | A6 | A8 | A10 | A12 | A14 | A16 | A18 | A20 |
|---|---|---|---|---|---|---|---|---|---|
| S1 | −1.1210E−04 | 2.4299E−03 | −5.5261E−03 | 7.8849E−03 | −6.7735E−03 | 3.5522E−03 | −1.1194E−03 | 1.9481E−04 | −1.4553E−05 |
| S2 | 1.0753E−02 | 7.4058E−03 | −4.0715E−02 | 5.5763E−02 | −4.1934E−02 | 1.9154E−02 | −5.2292E−03 | 7.7592E−04 | −4.7913E−05 |
| S3 | 9.5569E−03 | 5.5895E−03 | −3.8347E−02 | 5.4389E−02 | −4.1072E−02 | 1.8815E−02 | −5.1206E−03 | 7.4968E−04 | −4.4695E−05 |
| S4 | 2.5797E−03 | 1.8706E−04 | −4.2835E−04 | −1.6313E−02 | 3.3742E−02 | −3.1513E−02 | 1.5944E−02 | −4.2081E−03 | 4.5467E−04 |
| S5 | −8.1098E−03 | −1.9563E−03 | 5.8388E−03 | −1.3213E−02 | 1.3466E−02 | −8.9664E−03 | 4.2138E−03 | −1.1657E−03 | 1.3501E−04 |
| S6 | −1.5864E−02 | 1.8434E−02 | −3.7389E−02 | 6.1440E−02 | −6.5297E−02 | 4.3819E−02 | −1.7549E−02 | 3.8852E−03 | −3.7018E−04 |
| S7 | −4.0355E−02 | 2.8552E−02 | −4.9508E−02 | 5.6237E−02 | −4.0060E−02 | 1.7561E−02 | −4.3832E−03 | 5.5150E−04 | −2.5757E−05 |
| S8 | −3.4251E−02 | 8.2152E−03 | −4.5994E−03 | −1.7689E−03 | 4.1136E−03 | −2.6133E−03 | 8.5400E−04 | −1.4066E−04 | 9.1228E−06 |
| S9 | −4.0750E−02 | 1.5315E−02 | −6.8087E−03 | 1.3320E−03 | −1.5058E−04 | 2.4948E−05 | −1.5497E−05 | 4.2115E−06 | −3.4845E−07 |
| S10 | −5.7070E−02 | 1.9016E−02 | −5.1057E−03 | 7.7961E−04 | −6.8199E−05 | 8.9838E−07 | 1.0502E−06 | −1.5746E−07 | 7.0706E−09 |
| S11 | −1.9513E−02 | −7.9621E−03 | 2.7373E−03 | −3.8246E−04 | −2.6582E−05 | 1.6741E−05 | −2.2172E−07 | 1.2736E−07 | −2.7765E−09 |
| S12 | 2.5225E−02 | −1.9107E−02 | 4.9969E−03 | −7.6513E−04 | 5.2977E−05 | 1.9396E−06 | −5.9652E−07 | 3.7475E−08 | −8.0132E−10 |
| S13 | −3.5346E−03 | −3.0993E−03 | 1.0241E−03 | −1.2448E−04 | 8.2065E−06 | −3.1969E−07 | 7.3302E−09 | −9.1337E−11 | 4.7684E−13 |
| S14 | −2.0888E−02 | 2.1558E−03 | −2.4053E−04 | 3.0567E−05 | −2.8627E−06 | 1.5316E−07 | −4.2640E−09 | 5.3005E−11 | −1.7377E−13 | lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 3 is a table showing basic parameters of the optical imaging lens assembly in embodiment 2, wherein the units for the radius of curvature, the thickness and the focal length are millimeter (mm).

TABLE 3

| Lens number | Surface number | Surface type | Radius of curvature | Thickness | Material Refractive index | Abbe number | Conic coefficient | Focal length |
|---|---|---|---|---|---|---|---|---|
|  | OBJ | spherical | infinite | infinite |  |  |  |  |
|  | STO | spherical | infinite | −0.7615 |  |  |  |  |
| E1 | S1 | aspheric | 2.3955 | 1.0395 | 1.68 | 56.11 | −0.0042 | 5.06 |
|  | S2 | aspheric | 15.1777 | 0.0400 |  |  | 12.0927 |  |
| E2 | S3 | aspheric | 17.4330 | 0.3000 | 1.68 | 19.25 | −21.8278 | −9.49 |
|  | S4 | aspheric | 4.6739 | 0.2500 |  |  | −0.4568 |  |
| E3 | S5 | aspheric | 7.4179 | 0.3582 | 1.68 | 19.25 | 1.3825 | 37.29 |
|  | S6 | aspheric | 10.2834 | 0.3711 |  |  | 3.5653 |  |
| E4 | S7 | aspheric | 102.6616 | 0.5092 | 1.68 | 56.11 | 1.0809 | 396.50 |
|  | S8 | aspheric | 194.7479 | 0.5034 |  |  | −0.1292 |  |
| E5 | S9 | aspheric | 9.7338 | 0.4388 | 1.61 | 28.31 | 3.0001 | −31.68 |
|  | S10 | aspheric | 6.3567 | 0.4763 |  |  | 0.2109 |  |
| E6 | S11 | aspheric | 4.1679 | 0.6985 | 1.68 | 56.11 | −0.3134 | 8.35 |
|  | S12 | aspheric | 45.3787 | 1.1071 |  |  | 20.1075 |  |
| E7 | S13 | aspheric | −4.0641 | 0.6331 | 1.54 | 55.87 | −0.8930 | −5.25 |
|  | S14 | aspheric | 9.7338 | 0.3049 |  |  | 2.7206 |  |
| E8 | S15 | aspheric | infinite | 0.1100 | 1.52.. | 64.17 |  |  |
|  | S16 | aspheric | infinite | 0.4000 |  |  |  |  |
|  | S17 | aspheric | infinite |  |  |  |  |  |

In the embodiment 2, an effective focal length of the optical imaging lens assembly satisfies f=6.64 mm, a distance along the optical axis from the object-side surface S1 of the first lens E1 to the imaging plane S17 satisfies TTL=7.54 mm, half of the diagonal length of an effective pixel area on the imaging plane S17 satisfies ImgH=6.25 mm, half of a maximal field-of-view of the optical imaging lens assembly satisfies HFOV=42.44°, and a F number satisfies Fno=1.87.

Table 4 shows high-order coefficients applicable to each aspheric surface in embodiment 2, wherein the surface shape of each aspheric surface in embodiment 2 can be defined by the formula (1) given in the above embodiment 1.

TABLE 4

| Surface number | A4 | A6 | A8 | A10 | A12 |
|---|---|---|---|---|---|
| S1 | −1.1560E−03 | 6.0740E−03 | −1.1180E−02 | 1.2953E−02 | −9.4184E−03 |
| S2 | 1.1534E−02 | −1.9252E−02 | 2.3166E−02 | −2.1426E−02 | 1.4172E−02 |
| S3 | 1.1596E−02 | −1.8128E−02 | 2.1751E−02 | −1.8573E−02 | 1.1144E−02 |
| S4 | 4.5202E−03 | −1.1446E−02 | 3.0280E−02 | −5.4439E−02 | 6.1997E−02 |
| S5 | −9.5052E−03 | −1.0693E−02 | 2.7323E−02 | −4.7793E−02 | 5.0908E−02 |
| S6 | −1.2210E−02 | 9.9778E−03 | −2.7692E−02 | 5.2302E−02 | −5.8869E−02 |
| S7 | −2.7775E−01 | 7.3165E−04 | 7.0279E−03 | −2.0065E−02 | 2.4127E−02 |
| S8 | −3.4539E−02 | 1.7794E−02 | −2.3904E−02 | 2.0752E−02 | −1.2816E−02 |
| S9 | −5.8737E−02 | 2.6047E−02 | −7.9526E−03 | −3.2049E−03 | 3.8839E−03 |
| S10 | −7.6753E−02 | 3.3521E−02 | −1.2164E−02 | 2.8073E−03 | −4.1680E−02. |
| S11 | −2.7448E−02 | −3.4378E−03 | 2.0703E−03 | −4.6891E−04 | 2.2101E−05 |

TABLE 4-continued

| | | | | | |
|---|---|---|---|---|---|
| S12 | 1.4907E−02 | −1.4501E−02 | 4.5474E−03 | −9.0862E−04 | 1.1176E−04 |
| S13 | −1.0480E−02 | −2.3577E−04 | 5.1800E−04 | −7.4988E−05 | 5.2638E−06 |
| S14 | −2.2056E−02 | 2.9748E−03 | −3.6225E−04 | 3.1895E−05 | −1.6870E−06 |

| Surface number | A14 | A16 | A18 | A20 |
|---|---|---|---|---|
| S1 | 4.3289E−03 | −1.2248E−03 | 1.9540E−04 | −1.3668E−05 |
| S2 | −6.2265E−03 | 1.7049E−03 | −2.6080E−04 | 1.6531E−05 |
| S3 | −4.1974E−03 | 8.8751E−04 | −7.6952E−05 | −7.6717E−07 |
| S4 | −4.4222E−02 | 1.9213E−02 | −4.6387E−03 | 4.8088E−04 |
| S5 | −3.4413E−02 | 1.4512E−02 | −3.4532E−03 | 3.5459E−04 |
| S6 | 4.0666E−02 | −1.6613E−02 | 3.7268E−03 | −3.5527E−04 |
| S7 | −1.5886E−07 | 6.0442E−03 | −1.2189E−03 | 9.9710E−05 |
| S8 | 5.4342E−03 | −1.4710E−03 | 2.2945E−04 | −1.5563E−05 |
| S9 | −1.7324E−03 | 4.2404E−04 | −5.5912E−05 | 3.1329E−06 |
| S10 | 3.3793E−05 | 7.0457E−07 | −4.0347E−07 | 2.3399E−08 |
| S11 | 8.5260E−06 | −1.5073E−00 | 9.5703E−08 | −2.1958E−09 |
| S12 | −7.6537E−06 | 2.2785E−07 | 1.0301E−09 | −1.4761E−10 |
| S13 | −2.1065E−07 | 4.8752E−09 | −6.0674E−11 | 3.1427E−13 |
| S14 | 3.1723E−08 | 1.1973E−09 | −6.6402E−11 | 8.6076E−13 |

Figure 4A:
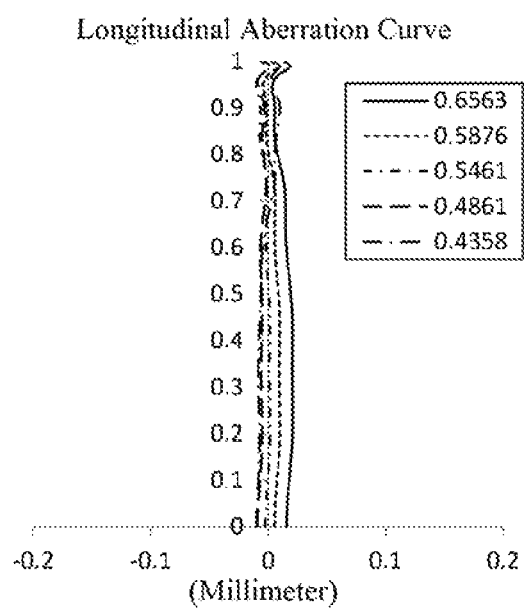
FIGS. 4A-4D illustrate a longitudinal aberration curve, an astigmatic curve, a distortion curve and a lateral color curve of the optical imaging lens assembly according to embodiment 2, respectively.
Figure 4B:
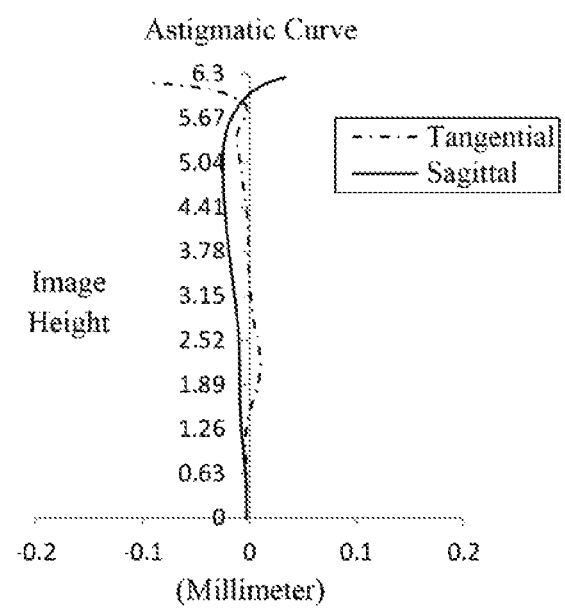
Figure 4C:
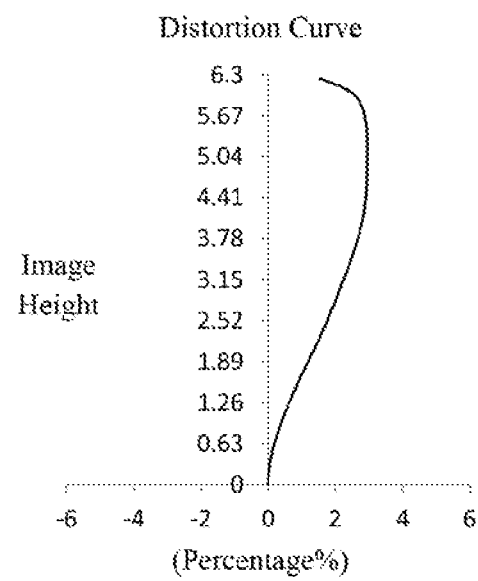
Figure 4D:
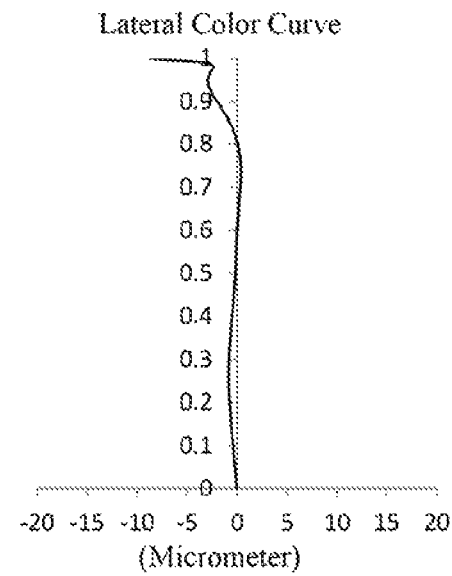

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different field-of-view angles. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve a good imaging quality.

Embodiment 3

Figure 5:
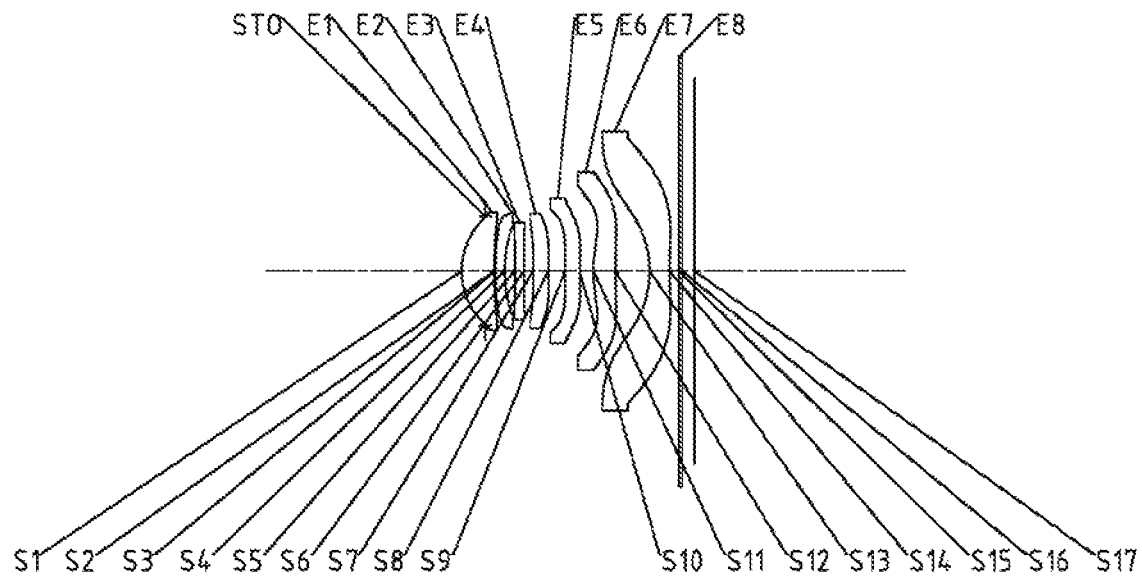
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light front the object sequentially passes through the respective surfaces S1 to S16 and is finally imaged on the imaging plane S17.

Table 5 is a table showing basic parameters of the optical imaging lens assembly in embodiment 3, wherein the units for the radius of curvature, the thickness and the focal length are millimeter (mm).

TABLE 5

| Lens number | Surface number | Surface type | Radius of curvature | Thickness | Material Refractive index | Material Abbe number | Conic coefficient | Focal length |
|---|---|---|---|---|---|---|---|---|
| | OBJ | spherical | infinite | infinite | | | | |
| | STO | spherical | infinite | −0.7503 | | | | |
| E1 | S1 | aspheric | 2.3873 | 1.0500 | 1.68 | 56.11 | −0.0103 | 5.07 |
| | S2 | aspheric | 14.5746 | 0.0401 | | | −7.1138 | |
| E2 | S3 | aspheric | 11.4511 | 0.3000 | 1.68 | 19.25 | 1.9710 | −11.93 |
| | S4 | aspheric | 4.6961 | 0.3291 | | | 0.3473 | |
| E3 | S5 | aspheric | 49.5852 | 0.3012 | 1.68 | 19.25 | 4.5235 | 768.95 |
| | S6 | aspheric | 54.6493 | 0.2911 | | | 5.0000 | |
| E4 | S7 | aspheric | 27.8234 | 0.4946 | 1.68 | 56.11 | −65.7658 | 335.46 |
| | S8 | aspheric | 32.5955 | 0.5414 | | | −99.0000 | |

TABLE 5-continued

| Lens number | Surface number | Surface type | Radius of curvature | Thickness | Material Refractive index | Abbe number | Conic coefficient | Focal length |
|---|---|---|---|---|---|---|---|---|
| E5 | S9 | aspheric | 14.2016 | 0.4706 | 1.61 | 27.32 | −9.0659 | −41.82 |
|  | S10 | aspheric | 8.7991 | 0.4494 |  |  | 0.3860 |  |
| E6 | S11 | aspheric | 4.2021 | 0.7155 | 1.68 | 56.11 | 0.0088 | 8.33 |
|  | S12 | aspheric | 51.0561 | 1.0963 |  |  | −10.8082 |  |
| E7 | S13 | aspheric | −3.8988 | 0.6441 | 1.54 | 55.87 | −1.0994 | −4.94 |
|  | S14 | aspheric | 8.8097 | 0.3067 |  |  | 0.1420 |  |
| E8 | S15 | aspheric | infinite | 0.1100 | 1.52 | 64.17 |  |  |
|  | S16 | aspheric | infinite | 0.4000 |  |  |  |  |
|  | S17 | aspheric | infinite |  |  |  |  |  |

An effective focal length of the optical imaging lens assembly satisfies f=6.65 mm, a distance along the optical axis from the object-side surface S1 of the first lens E1 to the imaging plane S17 satisfies TTL=7.54 mm, half of the diagonal length of an effective pixel area on the imaging plane S17 satisfies ImgH=6.25 mm, half of a maximal field-of-view of the optical imaging lens assembly satisfies HFOV=42.58°, and a F number satisfies Fno=1.88.

Table 6 shows high-order coefficients applicable to each aspheric surface in embodiment 3, wherein the surface shape of each aspheric surface in embodiment 3 can be defined by the formula (1) given in the above embodiment 1.

TABLE 6

| Surface number | A4 | A6 | A8 | A10 | A12 |
|---|---|---|---|---|---|
| S1 | −6.3134E−04 | 4.4038E−03 | −8.1061E−03 | 9.7548E−03 | −7.4263E−03 |
| S2 | 3.7430E−05 | −3.0702E−03 | 8.0241E−03 | −1.0023E−02 | 8.1654E−03 |
| S3 | 3.3700E−05 | −5.3215E−03 | 1.7004E−02 | −2.5247E−02 | 2.4307E−02 |
| S4 | 2.7643E−03 | 3.9400E−03 | −2.0418E−02 | 4.8843E−02 | −6.5709E−02 |
| S5 | −9.5533E−03 | 4.1700E−03 | −1.6615E−02 | 3.0101E−02 | −3.6398E−02 |
| S6 | −1.3325E−02 | 1.7850E−02 | −3.9865E−02 | 6.7589E−02 | −7.2381E−02 |
| S7 | −3.3228E−02 | 1.1738E−02 | −8.9663E−03 | 7.5038E−05 | 6.8733E−03 |
| S8 | −3.6682E−02 | 1.9975E−02 | −2.7752E−02 | 2.7487E−02 | −1.9256E−02 |
| S9 | −5.6513E−02 | 2.5288E−02 | −1.5087E−02 | 7.4650E−03 | −3.5680E−03 |
| S10 | −7.5469E−02 | 2.5531E−02 | −8.3580E−03 | 2.3274E−03 | −6.9112E−04 |
| S11 | −2.5185E−02 | −6.7201E−03 | 3.4698E−03 | −8.8703E−04 | 1.0234E−04 |
| S12 | 1.8351E−02 | −1.5594E−02 | 4.7179E−03 | −8.9716E−04 | 1.0242E−04 |
| S13 | −1.6219E−02 | −1.6756E−03 | 2.1353E−05 | 1.9759E−05 | −5.9981E−06 |
| S14 | −2.6613E−02 | 4.0915E−03 | −4.7775E−04 | 2.5286E−05 | 1.2748E−06 |

| Surface number | A14 | A16 | A18 | A20 |
|---|---|---|---|---|
| S1 | 3.5736E−03 | −1.0582E−03 | 1.7599E−06 | −1.2753E−05 |
| S2 | −4.3808E−03 | 1.4459E−03 | −2.9352E−04 | 2.4719E−05 |
| S3 | −1.4578E−02 | 5.3251E−03 | −1.0776E−03 | 9.2056E−05 |
| S4 | 5.3468E−02 | −2.5874E−02 | 6.8929E−03 | −7.7767E−04 |
| S5 | 2.8950E−02 | −1.4097E−02 | 3.8320E−03 | −4.4738E−04 |
| S6 | 4.9869E−02 | −2.0964E−02 | 4.9176E−03 | −4.9546E−04 |
| S7 | −6.1926E−03 | 2.6108E−03 | −5.3870E−04 | 4.3255E−05 |
| S8 | 8.9588E−03 | −2.5975E−03 | 4.2256E−04 | −2.9123E−05 |
| S9 | 1.2887E−03 | −2.9562E−04 | 3.7634E−05 | −1.9955E−06 |
| S10 | 1.8193E−04 | −2.9311E−05 | 2.4212E−06 | −7.9213E−08 |
| S11 | −8.3581E−07 | −8.5703E−07 | 7.0603E−08 | −1.7768E−09 |
| S12 | −6.0797E−06 | 1.0145E−07 | 5.9845E−09 | −2.2251E−10 |
| S13 | 5.9452E−07 | −2.8921E−08 | 7.1700E−10 | −6.9664E−12 |
| S14 | −2.8254E−07 | 1.7525E−08 | −4.9345E−10 | 5.3534E−12 |

Figures 6A, 6B:
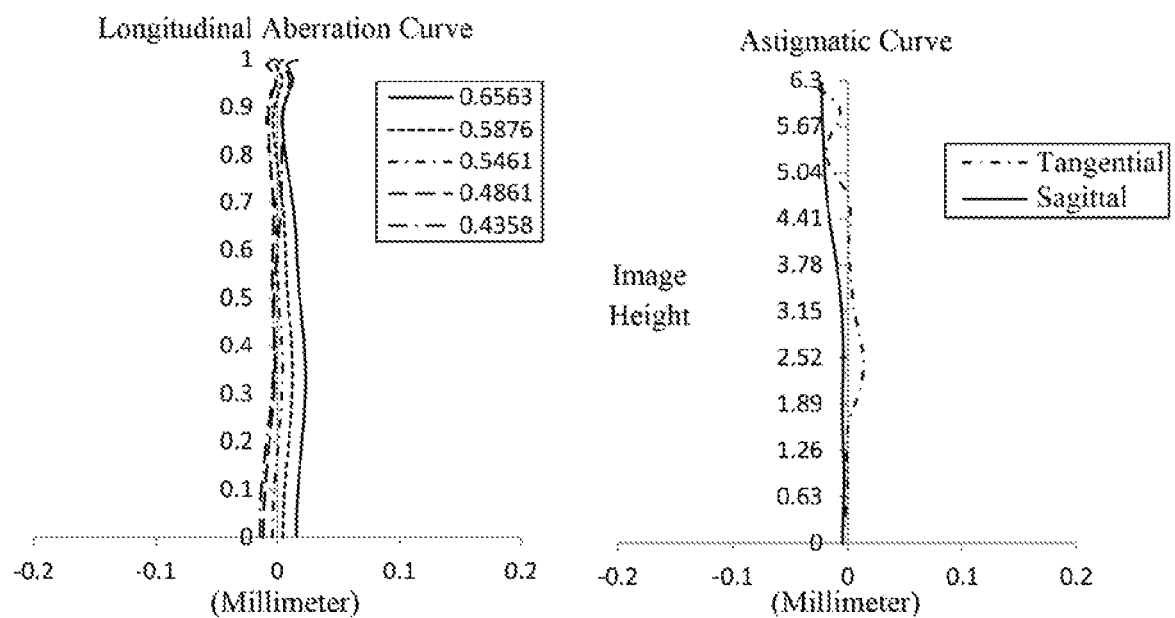
FIGS. 6A-6D illustrate a longitudinal aberration curve, an astigmatic curve, a distortion curve and a lateral color curve of the optical imaging lens assembly according to embodiment 3, respectively.
Figure 6C:
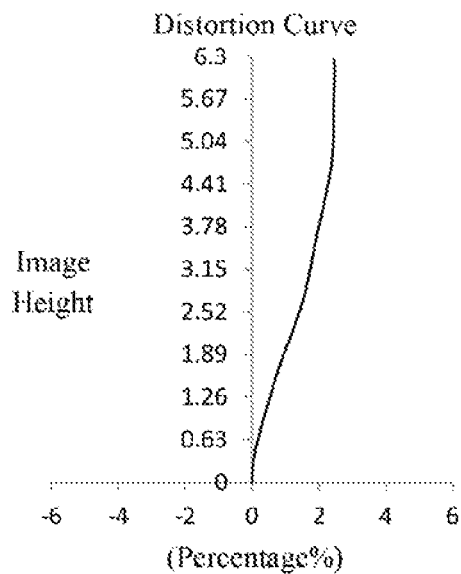
Figure 6D:
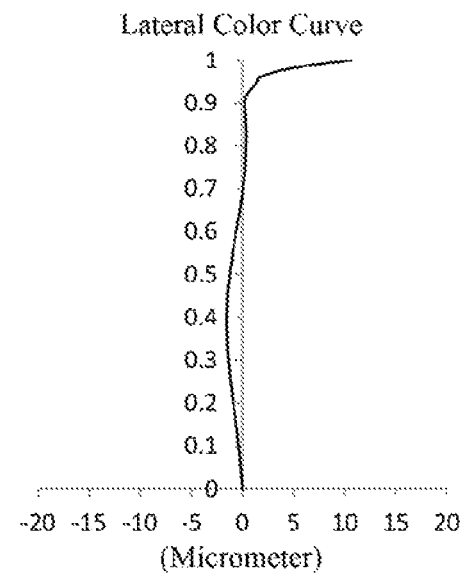

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C, illustrates a distortion curve of the optical imaging lens assembly according to embodiment 3, representing amounts of distortion corresponding to different field-of-view angles. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve a good imaging quality.

Embodiment 4

Figure 7:
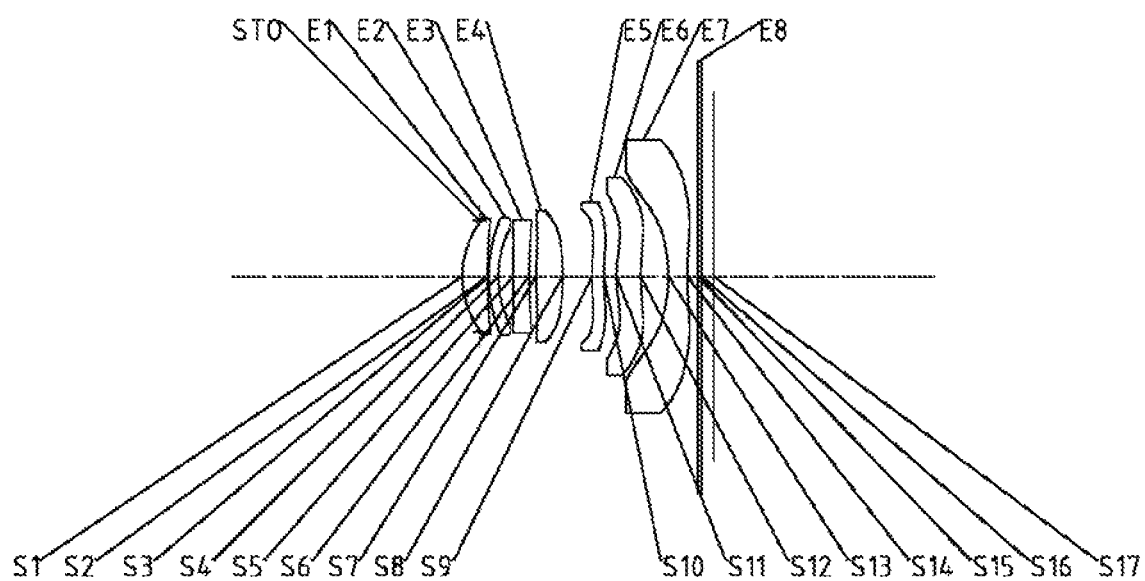
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 7 is a table showing basic parameters of the optical imaging lens assembly in embodiment 4, wherein live units for the radius of curvature, the thickness and the focal length are millimeter(mm).

TABLE 7

| Lens number | Surface number | Surface type | Radius of curvature | Thickness | Material Refractive index | Abbe number | Conic coefficient | Focal length |
|---|---|---|---|---|---|---|---|---|
|  | OBJ | spherical | infinite | infinite |  |  |  |  |
|  | STO | spherical | infinite | −0.5642 |  |  |  |  |
| E1 | S1 | aspheric | 2.9841 | 0.8114 | 1.68 | 56.11 | −0.1214 | 6.41 |
|  | S2 | aspheric | 18.2182 | 0.5000 |  |  | −3.1358 |  |
| E2 | S3 | aspheric | 4.8961 | 0.3000 | 1.68 | 19.25 | −4.0136 | −15.83 |
|  | S4 | aspheric | 3.2815 | 0.4764 |  |  | −0.5625 |  |
| E3 | S5 | aspheric | 16.6055 | 0.5142 | 1.68 | 19.25 | −99.0000 | −27.84 |
|  | S6 | aspheric | 8.7326 | 0.2313 |  |  | −99.0000 |  |
| E4 | S7 | aspheric | 10.3440 | 0.8545 | 1.68 | 56.11 | −24.6010 | 10.63 |
|  | S8 | aspheric | −12.8689 | 0.9494 |  |  | 5.0000 |  |
| E5 | S9 | aspheric | 7.3788 | 0.3870 | 1.57 | 37.32 | −34.8662 | −24.27 |
|  | S10 | aspheric | 4.7236 | 0.4056 |  |  | −1.0145 |  |
| E6 | S11 | aspheric | 3.8298 | 0.7806 | 1.65 | 23.53 | −0.7068 | 10.91 |
|  | S12 | aspheric | 7.7155 | 0.8962 |  |  | −19.0952 |  |
| E7 | S13 | aspheric | −4.8735 | 0.6084 | 1.54 | 55.87 | −1.2935 | −6.20 |
|  | S14 | aspheric | 11.0121 | 0.3452 |  |  | −3.1135 |  |
| E8 | S15 | aspheric | infinite | 0.1100 | 1.52 | 64.17 |  |  |
|  | S16 | aspheric | infinite | 0.4000 |  |  |  |  |
|  | S17 | aspheric | infinite |  |  |  |  |  |

An effective focal length of the optical imaging lens assembly satisfies f=6.76 mm, a distance along the optical axis from the object-side surface S1 of the first lens E1 to the imaging plane S17 satisfies TTL=8.12 mm, half of the diagonal length of an effective pixel area on the imaging plane S17 satisfies ImgH=6.00 mm, half of a maximal field-of-view of the optical imaging lens assembly satisfies HFOV=40.18°, and a F number satisfies Fno=1.88.

Table 8 shows high-order coefficients applicable to each aspheric surface in embodiment 4, wherein the surface shape of each aspheric surface in embodiment 4 can be defined by the formula (1) given in the above embodiment 1.

TABLE 8

| Surface number | A4 | A6 | A8 | A10 | A12 |
|---|---|---|---|---|---|
| S1 | −6.5338E−04 | 7.9760E−05 | −1.2225E−04 | 2.6491E−05 | −2.9100E−05 |
| S2 | 3.1934E−03 | −1.2458E−03 | −1.7443E−03 | 1.6749E−03 | −4.5068E−04 |
| S3 | 1.2614E−03 | 2.8283E−03 | −5.5860E−03 | 4.1360E−03 | −1.2579E−03 |
| S4 | −5.6648E−03 | 8.6479E−03 | −1.3810E−02 | 1.5580E−02 | −1.2024E−02 |
| S5 | −1.6890E−02 | 1.7708E−02 | −3.4458E−02 | 4.5361E−02 | −3.8447E−02 |
| S6 | −6.2883E−03 | −1.7070E−03 | 3.3019E−03 | −4.1101E−03 | 3.4860E−03 |
| S7 | −1.6729E−02 | 2.5991E−03 | 9.8821E−04 | −3.3067E−03 | 2.8293E−03 |
| S8 | −1.6420E−02 | 6.2460E−03 | −9.2946E−03 | 7.4926E−03 | −3.9008E−03 |
| S9 | −3.9529E−02 | 2.2701E−02 | −6.7243E−03 | −1.9065E−03 | 2.0031E−03 |
| S10 | −9.3057E−02 | 5.3406E−02 | −2.2137E−02 | 5.7241E−03 | −9.3902E−04 |

TABLE 8-continued

| | | | | | |
|---|---|---|---|---|---|
| S11 | −5.3031E−02 | 1.1104E−02 | −2.5321E−03 | 7.3653E−05 | 1.3176E−04 |
| S12 | 4.2033E−04 | −6.7249E−03 | 1.7796E−03 | −3.5039E−04 | 5.6297E−05 |
| S13 | 1.0593E−02 | −8.1716E−03 | 1.6687E−03 | −1.7274E−04 | 1.0802E−05 |
| S14 | 1.5621E−03 | −5.0390E−03 | 1.1659E−03 | −1.3894E−04 | 9.9465E−06 |

| Surface number | A14 | A16 | A18 | A20 |
|---|---|---|---|---|
| S1 | 2.2307E−05 | −9.2475E−06 | 2.0173E−06 | −1.7491E−07 |
| S2 | −7.6477E−05 | 7.5998E−05 | −1.7205E−05 | 1.3240E−06 |
| S3 | −4.0176E−05 | 1.5567E−04 | −4.4640E−05 | 4.1692E−06 |
| S4 | 6.1380E−03 | −1.9497E−03 | 3.4910E−04 | −2.6783E−05 |
| S5 | 2.0511E−02 | −6.6465E−03 | 1.1958E−03 | −9.1259E−05 |
| S6 | −1.7619E−03 | 5.2256E−04 | −8.0739E−05 | 4.8568E−05 |
| S7 | −1.2726E−03 | 3.2417E−04 | −4.3059E−05 | 2.2818E−06 |
| S8 | 1.2827E−03 | −2.5588E−04 | 2.8029E−05 | −1.2784E−06 |
| S9 | −6.7635E−04 | 1.1957E−04 | −1.1055E−05 | 4.2076E−07 |
| S10 | 9.8825E−05 | −6.4870E−06 | 2.4219E−07 | −3.9331E−09 |
| S11 | −3.2766E−05 | 3.4584E−06 | −1.7405E−07 | 3.4183E−09 |
| S12 | −6.1378E−06 | 3.9808E−07 | −1.3734E−08 | 1.9398E−10 |
| S13 | −4.2777E−07 | 1.0549E−08 | −1.4823E−10 | 9.0754E−13 |
| S14 | −4.4441E−07 | 1.2134E−08 | −1.8493E−10 | 1.2030E−12 |

Figure 8A:
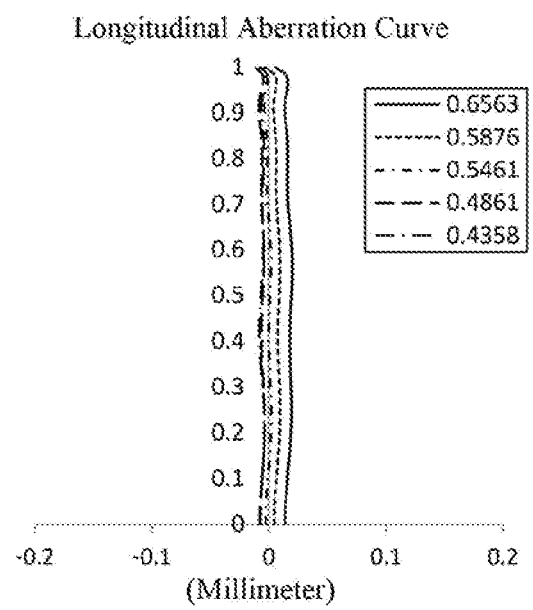
FIGS. 8A-8D illustrate a longitudinal aberration curve, an astigmatic curve, a distortion curve and a lateral color curve of the optical imaging lens assembly according to embodiment 4, respectively.
Figure 8B:
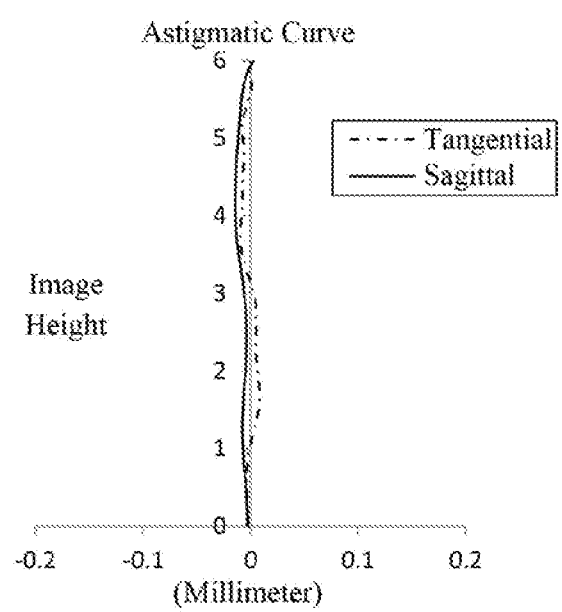
Figure 8C:
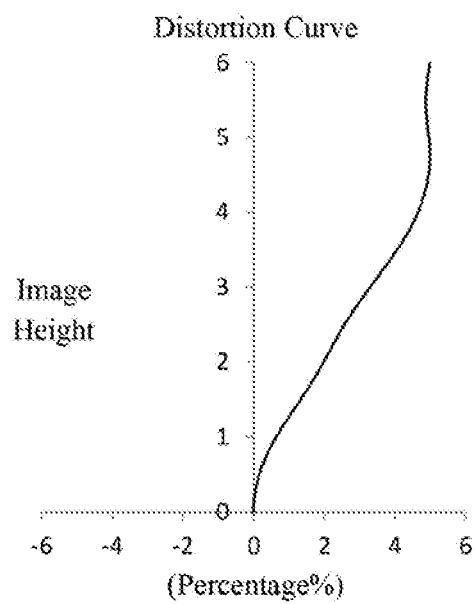
Figure 8D:
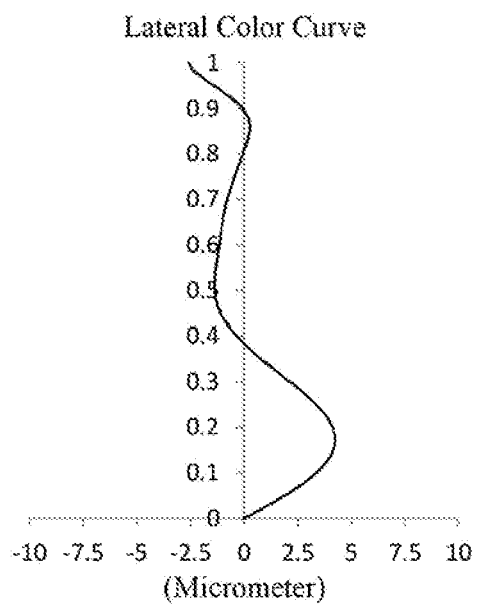

FIG. 8A illustrates a longitudinal aberration curve of the optical imaging lens assembly according to embodiment 4, representing deviations of focal points converged by light of different wavelength after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different field-of-view angles. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve a good imaging quality.

Embodiment 5

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface, the fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 9 is a table showing basic parameters of the optical imaging lens assembly in embodiment 5, wherein the units for the radius of curvature, the thickness and the focal length are millimeter(mm).

TABLE 9

| | | | | | Material | | | |
|---|---|---|---|---|---|---|---|---|
| Lens number | Surface number | Surface type | Radius of curvature | Thickness | Refractive index | Abbe number | Conic coefficient | Focal length |
| | OBJ | spherical | infinite | infinite | | | | |
| | STO | spherical | infinite | 0.3167 | | | | |
| E1 | S1 | aspheric | 3.7301 | 0.6782 | 1.68 | 56.11 | −1.1545 | 8.06 |
| | S2 | aspheric | 22.7728 | 0.0500 | | | −94.8857 | |
| E2 | S3 | aspheric | 5.4699 | 0.3449 | 1.68 | 19.25 | −16.1984 | −19.97 |
| | S4 | aspheric | 3.7992 | 0.4444 | | | −2.6807 | |
| E3 | S5 | aspheric | 8.5334 | 0.4272 | 1.68 | 19.25 | −69.1786 | −48.11 |
| | S6 | aspheric | 6.6300 | 0.3245 | | | −56.6283 | |

TABLE 9-continued

| Lens number | Surface number | Surface type | Radius of curvature | Thickness | Material Refractive index | Abbe number | Conic coefficient | Focal length |
|---|---|---|---|---|---|---|---|---|
| E4 | S7 | aspheric | 25.9208 | 1.0166 | 1.68 | 56.11 | −77.5123 | 7.92 |
|  | S8 | aspheric | 5.1249 | 0.9889 |  |  | 4.0478 |  |
| E5 | S9 | aspheric | 3.2414 | 0.4188 | 1.57 | 37.32 | −2.9918 | −40.16 |
|  | S10 | aspheric | 2.7067 | 0.9429 |  |  | −1.3667 |  |
| E6 | S11 | aspheric | 3.1586 | 0.7513 | 1.65 | 23.53 | −2.6369 | −14.27 |
|  | S12 | aspheric | 2.1330 | 0.3589 |  |  | −5.7194 |  |
| E7 | S13 | aspheric | 15.3267 | 0.5753 | 1.54 | 55.87 | −99.0000 | −288.60 |
|  | S14 | aspheric | 13.7651 | 0.4085 |  |  | −1.5078 |  |
| E8 | S15 | aspheric | infinite | 0.1100 | 1.52 | 64.17 |  |  |
|  | S16 | aspheric | infinite | 0.4000 |  |  |  |  |
|  | S17 | aspheric | infinite |  |  |  |  |  |

An effective focal length of the optical imaging lens assembly satisfies f=6.49 mm, a distance along the optical axis from the object-side surface S1 of the first lens E1 to the imaging plane S17 satisfies TTL=8.24 mm, half of the diagonal length of an effective pixel area on the imaging plane S17 satisfies ImgH=6.25 mm, half of a maximal field-of-view of the optical imaging lens assembly satisfies HFOV=42.95°, and a F number satisfies Fno=1.88.

Table 10 shows high-order coefficients applicable to each aspheric surface in embodiment 5, wherein the surface shape of each aspheric surface in embodiment 5 can be defined by the formula (1) given in the above embodiment 1.

TABLE 10

| Surface number | A4 | A6 | A8 | A10 | A12 |
|---|---|---|---|---|---|
| S1 | −2.0582E−03 | 9.4844E−04 | −3.1724E−03 | 2.5769E−03 | −1.2019E−03 |
| S2 | −1.2625E−02 | −5.0395E−03 | 7.9491E−03 | −4.2987E−03 | 1.1238E−03 |
| S3 | 2.0026E−03 | −1.0297E−02 | 1.0109E−02 | −4.9572E−03 | 1.2945E−03 |
| S4 | −3.7908E−04 | −3.9511E−03 | 1.9673E−03 | −2.2305E−03 | 2.0699E−03 |
| S5 | −1.5484E−02 | −2.4614E−04 | −5.7045E−03 | 6.8165E−03 | −4.1134E−03 |
| S6 | −7.5832E−03 | −7.0420E−03 | 6.7904E−04 | 2.3550E−03 | −1.8751E−03 |
| S7 | −1.1046E−02 | 2.6037E−03 | −5.5811E−03 | 4.1922E−03 | −1.9656E−03 |
| S8 | −8.6016E−03 | 2.5816E−03 | −2.2223E−03 | 1.2968E−03 | −5.2039E−04 |
| S9 | −3.2461E−02 | 1.3436E−02 | −5.3639E−03 | 7.7051E−04 | 7.6172E−06 |
| S10 | −5.4176E−02 | 2.8259E−02 | −1.1546E−02 | 2.7715E−03 | −4.0624E−04 |
| S11 | −7.8966E−02 | 1.7179E−02 | −2.3080E−03 | 1.4216E−04 | 2.0766E−06 |
| S12 | −4.5164E−02 | 9.1853E−03 | −1.5446E−03 | 1.7257E−04 | −1.1195E−05 |
| S13 | −9.8954E−03 | −2.1434E−04 | 8.8577E−05 | −6.1112E−06 | 2.4819E−07 |
| S14 | 3.5376E−02 | −2.5614E−03 | 5.2777E−04 | −6.3030E−05 | 4.3802E−06 |

| Surface number | A14 | A16 | A18 | A20 |
|---|---|---|---|---|
| S1 | 2.9270E−04 | −2.9397E−05 | 0.0000E−00 | 0.0000E−00 |
| S2 | −1.2250E−04 | 0.0000E−00 | 0.0000E−00 | 0.0000E−00 |
| S3 | −1.4775E−04 | 0.0000E−00 | 0.0000E−00 | 0.0000E−00 |
| S4 | −1.1653E−03 | 3.3526E−04 | −3.6509E−05 | 0.0000E−00 |
| S5 | 1.2623E−03 | −1.4154E−05 | 0.0000E−00 | 0.0000E−00 |
| S6 | 6.9578E−04 | −1.1009E−04 | 5.4813E−06 | 0.0000E−00 |
| S7 | 5.6040E−04 | −8.3672E−05 | 4.9500E−06 | 0.0000E−00 |
| S8 | 1.3365E−04 | −2.0466E−05 | 1.6760E−06 | −5.6075E−08 |
| S9 | −1.4327E−05 | 1.0885E−06 | 0.0000E−00 | 0.0000E−00 |
| S10 | 3.5656E−05 | −1.7093E−06 | 3.4305E−08 | 0.0000E−00 |
| S11 | −6.8674E−07 | 2.3206E−08 | 0.0000E−00 | 0.0000E−00 |
| S12 | 3.8187E−07 | −5.3188E−09 | 0.0000E−00 | 0.0000E−00 |
| S13 | −6.2465E−09 | 6.9631E−11 | 0.0000E−00 | 0.0000E−00 |
| S14 | −1.7595E−07 | 3.8044E−09 | −3.4283E−11 | 0.0000E−00 |

Figure 10C:
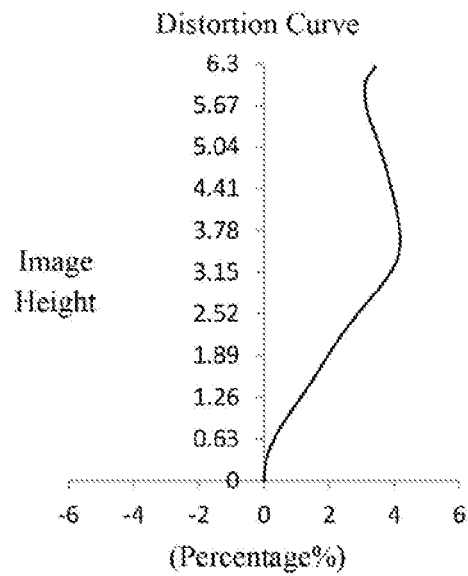
Figure 10D:
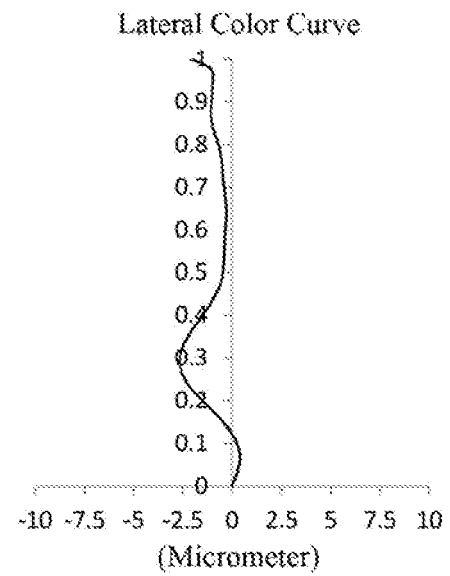

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different field-of-view angles. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve a good imaging quality.

Embodiment 6

Figure 11:
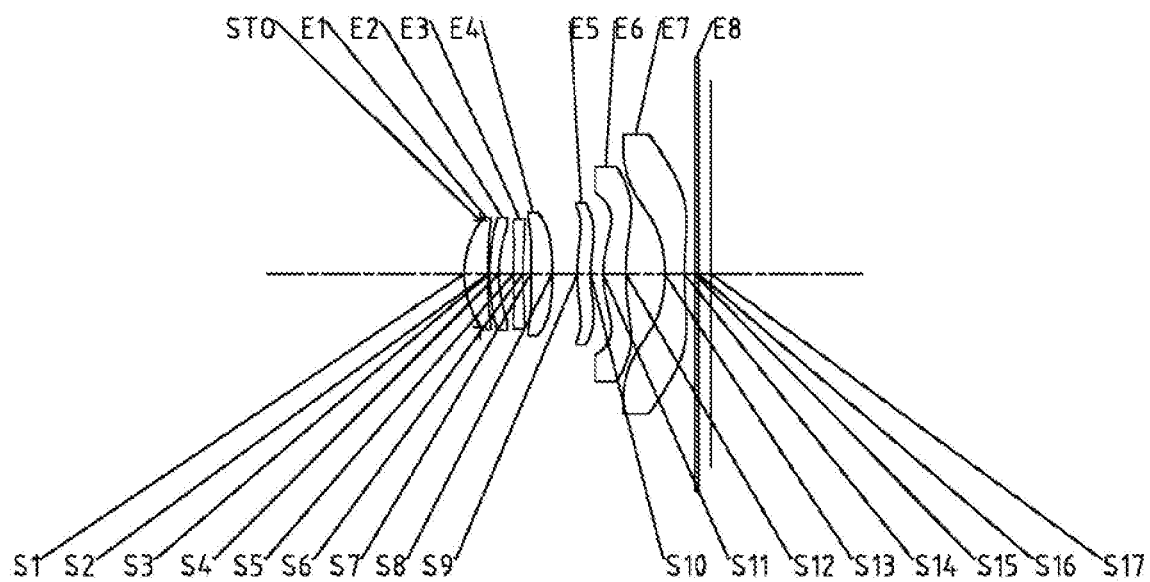
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth fens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 11 is a table showing basic parameters of the optical imaging lens assembly in embodiment 6, wherein the units for the radius of curvature, the thickness and the focal length are millimeter (mm).

TABLE 11

| Lens number | Surface number | Surface type | Radius of curvature | Thickness | Material Refractive index | Abbe number | Conic coefficient | Focal length |
|---|---|---|---|---|---|---|---|---|
| | OBJ | spherical | infinite | infinite | | | | |
| | STO | spherical | infinite | −0.5048 | | | | |
| E1 | S1 | aspheric | 2.9841 | 0.7604 | 1.68 | 56.11 | −0.1455 | 6.42 |
| | S2 | aspheric | 18.2182 | 0.0500 | | | 2.5577 | |
| E2 | S3 | aspheric | 6.7928 | 0.3000 | 1.68 | 19.25 | −4.7380 | −15.32 |
| | S4 | aspheric | 4.0370 | 0.4686 | | | −0.4987 | |
| E3 | S5 | aspheric | 10.8616 | 0.3000 | 1.68 | 19.25 | −99.0000 | −37.56 |
| | S6 | aspheric | 7.5341 | 0.2623 | | | −92.4718 | |
| E4 | S7 | aspheric | 24.1533 | 0.6839 | 1.68 | 56.11 | −99.0000 | 17.49 |
| | S8 | aspheric | −15.6665 | 0.8084 | | | 4.6567 | |
| E5 | S9 | aspheric | 4.6854 | 0.4478 | 1.68 | 56.11 | −23.0172 | −28.80 |
| | S10 | aspheric | 3.4940 | 0.4018 | | | −2.4814 | |
| E6 | S11 | aspheric | 2.8004 | 0.7356 | 1.68 | 56.11 | −0.9545 | 7.29 |
| | S12 | aspheric | 8.5635 | 1.2515 | | | −1.3306 | |
| E7 | S13 | aspheric | −4.8735 | 0.6252 | 1.54 | 55.87 | −1.0992 | −6.20 |
| | S14 | aspheric | 11.0121 | 0.3461 | | | −0.9032 | |
| E8 | S15 | aspheric | infinite | 0.1100 | 1.52 | 64.17 | | |
| | S16 | aspheric | infinite | 0.4000 | | | | |
| | S17 | aspheric | infinite | | | | | |

An effective focal length of the optical imaging lens assembly satisfies f=6.44 mm, a distance along the optical axis from the object-side surface S1 of the first lens E1 to the imaging plane S17 satisfies TTL=7.93 mm, half of the diagonal length of an effective pixel area on the imaging plane S17 satisfies ImgH=6.25 mm, half of a maximal field-of-view of the optical imaging lens assembly satisfies HFOV=42.54°, and a F number satisfies Fno=1.88.

Table 12 shows high-order coefficients applicable to each aspheric surface in embodiment 6, wherein the surface shape of each aspheric surface in embodiment 6 can be defined by the formula (1) given in the above embodiment 1.

TABLE 12

| Surface number | A4 | A6 | A8 | A10 | A12 |
|---|---|---|---|---|---|
| S1 | −5.6287E−04 | 2.8441E−03 | −5.1664E−03 | 5.1783E−03 | −3.1703E−03 |
| S2 | 1.0150E−02 | −2.3016E−02 | 3.0154E−02 | −2.8543E−02 | 1.9561E−02 |
| S3 | 1.0996E−02 | −2.2897E−02 | 3.1273E−02 | −3.1923E−02 | 2.4498E−02 |
| S4 | −6.0795E−04 | 1.3782E−03 | −1.2975E−02 | 2.4725E−02 | −2.5617E−02 |
| S5 | −1.7222E−02 | 5.9941E−03 | −2.4605E−02 | 3.9787E−02 | −3.8074E−02 |

TABLE 12-continued

| | | | | | |
|---|---|---|---|---|---|
| S6 | −1.2010E−03 | −1.0854E−02 | 1.2261E−03 | 7.3480E−03 | −8.3123E−03 |
| S7 | −1.7329E−02 | 4.3672E−03 | −7.8437E−03 | 7.6875E−03 | −5.0402E−03 |
| S8 | −2.2132E−02 | 8.2885E−03 | −1.0500E−02 | 7.9831E−03 | −4.0753E−03 |
| S9 | −3.1928E−02 | 2.5825E−02 | −1.6040E−02 | 6.4111E−03 | −1.7784E−03 |
| S10 | −9.9489E−02 | 5.7750E−02 | −2.7752E−02 | 9.5806E−03 | −2.3321E−03 |
| S11 | −4.2243E−02 | 8.6808E−03 | −2.1147E−03 | 7.7039E−05 | 1.0104E−04 |
| S12 | 1.2310E−02 | −9.1366E−03 | 2.3986E−03 | −4.3401E−04 | 5.1864E−05 |
| S13 | −7.9402E−05 | −1.0385E−02 | 3.3116E−03 | −4.6730E−04 | 3.7937E−05 |
| S14 | 6.5536E−03 | −8.5604E−03 | 2.1041E−03 | −2.8945E−04 | 2.4592E−05 |

| Surface number | A14 | A16 | A18 | A20 |
|---|---|---|---|---|
| S1 | 1.1861E−03 | −2.6078E−04 | 3.0631E−05 | −1.4756E−06 |
| S2 | −9.0477E−03 | 2.6208E−03 | −4.2375E−04 | 2.8774E−05 |
| S3 | −1.2735E−02 | 4.1274E−03 | −7.4446E−04 | 5.6561E−05 |
| S4 | 1.6191E−02 | −6.2096E−03 | 1.3284E−03 | −1.2039E−04 |
| S5 | 2.2667E−02 | −8.1660E−03 | 1.6379E−03 | −1.3955E−04 |
| S6 | 4.8889E−03 | −1.6319E−03 | 2.9719E−04 | −2.3118E−05 |
| S7 | 2.2604E−03 | −6.3720E−04 | 1.0097E−04 | −6.8083E−06 |
| S8 | 1.3567E−03 | −2.7859E−04 | 3.1503E−05 | −2.9123E−06 |
| S9 | 3.2535E−04 | −3.6487E−05 | 2.2546E−06 | −5.8686E−08 |
| S10 | 3.7684E−04 | −3.7427E−05 | 2.0467E−06 | −4.7035E−08 |
| S11 | −3.3127E−05 | 4.7197E−06 | −3.1605E−07 | 8.0660E−09 |
| S12 | −3.8724E−06 | 1.7193E−07 | −4.1252E−09 | 4.0921E−11 |
| S13 | −1.9045E−06 | 5.8886E−08 | −1.0346E−09 | 7.9380E−12 |
| S14 | −1.3025E−06 | 4.1709E−08 | −7.3714E−10 | 5.5095E−12 |

Figure 12A:
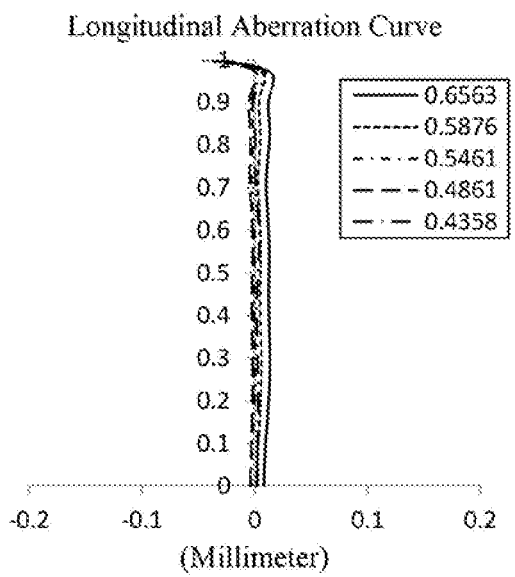
FIGS. 12A-12D illustrate a longitudinal aberration curve, an astigmatic curve, a distortion curve and a lateral color curve of the optical imaging lens assembly according to embodiment 6, respectively.
Figure 12B:
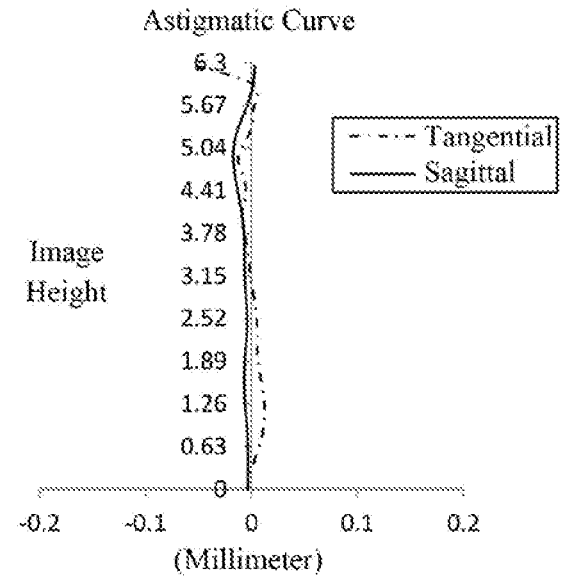
Figure 12C:
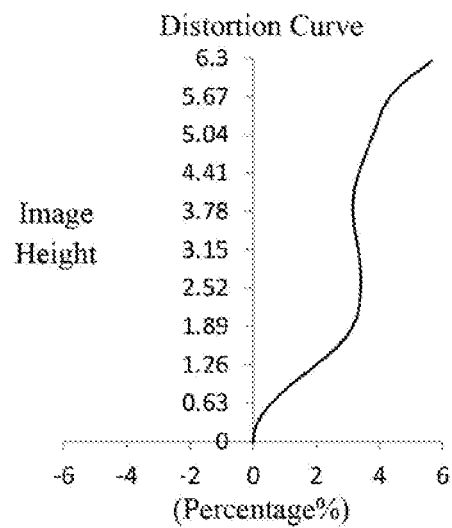
Figure 12D:
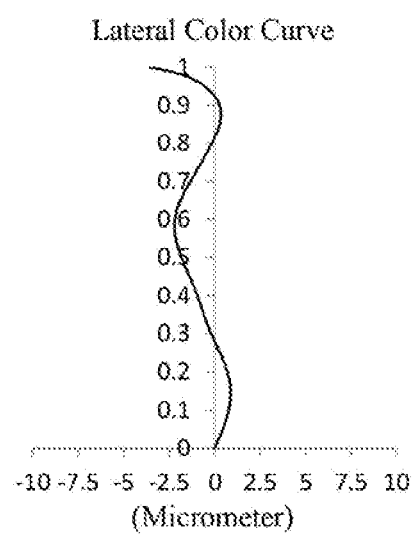

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different field-of-view angles. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve a good imaging qualify.

Embodiment 7

Figure 13:
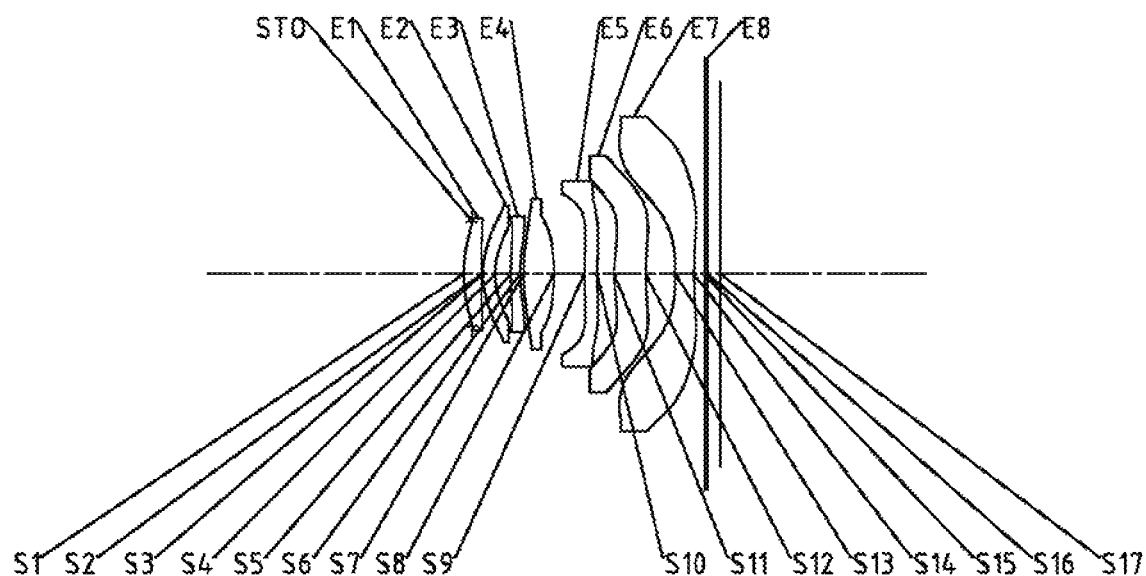
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 13 is a table showing basic parameters of the optical imaging lens assembly in embodiment 7, wherein live units for the radius of curvature, the thickness and the focal length are millimeter (mm).

TABLE 13

| Lens number | Surface number | Surface type | Radius of curvature | Thickness | Material Refractive index | Material Abbe number | Conic coefficient | Focal length |
|---|---|---|---|---|---|---|---|---|
| | OBJ | spherical | infinite | infinite | | | | |
| | STO | spherical | infinite | −0.2639 | | | | |
| E1 | S1 | aspheric | 4.6626 | 0.5729 | 1.68 | 56.11 | 0.2107 | 10.12 |
| | S2 | aspheric | 28.4660 | 0.0500 | | | 0.0982 | |

TABLE 13-continued

| Lens number | Surface number | Surface type | Radius of curvature | Thickness | Material Refractive index | Abbe number | Conic coefficient | Focal length |
|---|---|---|---|---|---|---|---|---|
| E2 | S3 | aspheric | 2.9641 | 0.3873 | 1.68 | 19.25 | 6.7366 | −34.16 |
|  | S4 | aspheric | 2.4895 | 0.4963 |  |  | 6.0735 |  |
| E3 | S5 | aspheric | 7.9229 | 0.3000 | 1.68 | 19.25 | −73.0641 | −14.55 |
|  | S6 | aspheric | 4.3306 | 0.1241 |  |  | 80.0000 |  |
| E4 | S7 | aspheric | 5.8811 | 0.9715 | 1.68 | 56.11 | −73.520 | 6.48 |
|  | S8 | aspheric | −8.3676 | 0.9814 |  |  | −63.0221 |  |
| E5 | S9 | aspheric | 10.2293 | 0.4134 | 1.68 | 56.11 | 30.7338 | −41.11 |
|  | S10 | aspheric | 6.9284 | 0.5495 |  |  | −4.5924 |  |
| E6 | S11 | aspheric | 3.9621 | 1.0151 | 1.68 | 56.11 | 0.5044 | 16.43 |
|  | S12 | aspheric | 5.6857 | 0.9573 |  |  | −1.7073 |  |
| E7 | S13 | aspheric | −7.6149 | 0.6009 | 1.54 | 55.87 | −0.3652 | −9.74 |
|  | S14 | aspheric | 17.2034 | 0.3355 |  |  | −6.6864 |  |
| E8 | S15 | aspheric | infinite | 0.1100 | 1.52 | 64.17 |  |  |
|  | S16 | aspheric | infinite | 0.4000 |  |  |  |  |
|  | S17 | aspheric | infinite |  |  |  |  |  |

An effective focal length of the optical imaging lens assembly satisfies f=6.41 mm, a distance along the optical axis from the object-side surface S1 of the first lens E1 to the imaging plane S17 satisfies TTL=8.27 mm, half of the diagonal length of an effective pixel area on the imaging plane S17 satisfies ImgH=6.25 mm, half of a maximal field-of-view of the optical imaging lens assembly satisfies HFOV=42.84°, and a F number satisfies Fno=1.88.

Table 14 shows high-order coefficients applicable to each aspheric surface in embodiment 7, wherein the surface shape of each aspheric surface in embodiment 7 can be defined by the formula (1) given in the above embodiment 1.

representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different field-of-view angles. FIG. 14D illustrates a lateral color curve of the optical imaging lens assembly according to embodiment 7, representing deviations of different image heights on an imaging plane after

TABLE 14

| Surface number | A4 | A6 | A8 | A10 | A12 |
|---|---|---|---|---|---|
| S1 | −3.0416E−03 | 7.2895E−04 | −7.0360E−04 | 9.2618E−04 | −4.4359E−04 |
| S2 | −2.5848E−02 | 2.4854E−02 | −1.8113E−02 | 9.5582E−03 | −3.4217E−03 |
| S3 | −8.1094E−03 | 1.1033E−02 | −5.4296E−03 | 1.3253E−03 | 6.1406E−04 |
| S4 | −2.0403E−03 | −8.6564E−03 | 1.0625E−02 | −8.2709E−03 | 4.7764E−03 |
| S5 | −3.3388E−03 | 1.0003E−03 | −2.9860E−03 | 6.4028E−04 | 4.7716E−04 |
| S6 | −9.3219E−04 | 6.0315E−04 | −8.1058E−04 | −3.1521E−04 | 3.6626E−04 |
| S7 | −3.5634E−04 | 1.4037E−03 | −4.9964E−04 | −6.9434E−05 | 6.3196E−05 |
| S8 | −1.1039E−02 | 2.7449E−05 | −8.3532E−04 | 4.5749E−04 | −1.4005E−04 |
| S9 | −3.0216E−02 | 1.4796E−02 | −4.9612E−03 | 2.3377E−04 | 2.6094E−04 |
| S10 | −6.6178E−02 | 3.5370E−02 | −1.2872E−02 | 2.7658E−03 | −3.5518E−04 |
| S11 | −5.2241E−02 | 1.5247E−02 | −3.9553E−03 | 5.7715E−04 | −4.5479E−05 |
| S12 | −1.8222E−02 | 3.9209E−3 | −1.1580E−03 | 1.7129E−04 | −1.3574E−05 |
| S13 | −1.1688E−02 | −2.8270E−03 | 7.3184E−04 | −6.5016E−05 | 3.0884E−06 |
| S14 | 1.1839E−02 | −7.9437E−03 | 1.5359E−03 | −1.6129E−04 | 1.0318E−05 |

| Surface number | A14 | A16 | A18 | A20 |
|---|---|---|---|---|
| S1 | 1.3199E−04 | −2.3463E−05 | 2.1824E−06 | −8.0898E−08 |
| S2 | 6.8718E−04 | −6.3397E−05 | −2.0854E−07 | 3.0546E−07 |
| S3 | −5.6872E−04 | 1.6265E−04 | −2.0493E−05 | 9.6936E−07 |
| S4 | −1.7965E−03 | 3.8675E−04 | −4.2557E−05 | 1.8473E−06 |
| S5 | −3.4101E−04 | 8.9907E−05 | −1.0798E−05 | 4.9024E−07 |
| S6 | −1.1852E−04 | 1.9117E−05 | −1.5550E−06 | 5.0258E−08 |
| S7 | −1.2837E−05 | 1.2190E−06 | −5.6524E−08 | 1.0333E−09 |
| S8 | 2.0658E−05 | −1.3003E−06 | 1.5965E−08 | 9.6689E−10 |
| S9 | −7.6914E−05 | 9.5220E−06 | −5.5946E−07 | 1.2748E−08 |
| S10 | 2.7814E−05 | −1.3082E−06 | 3.4121E−08 | −3.8121E−10 |
| S11 | 1.8697E−06 | −3.1759E−08 | −1.3451E−10 | 7.8698E−12 |
| S12 | 6.2226E−07 | −1.6617E−08 | 2.4062E−10 | −1.4628E−12 |
| S13 | −8.6075E−08 | 1.4099E−09 | −1.2577E−11 | 4.7193E−14 |
| S14 | −4.1374E−07 | 1.0121E−08 | −1.3732E−10 | 7.8784E−13 |

Figure 14A:
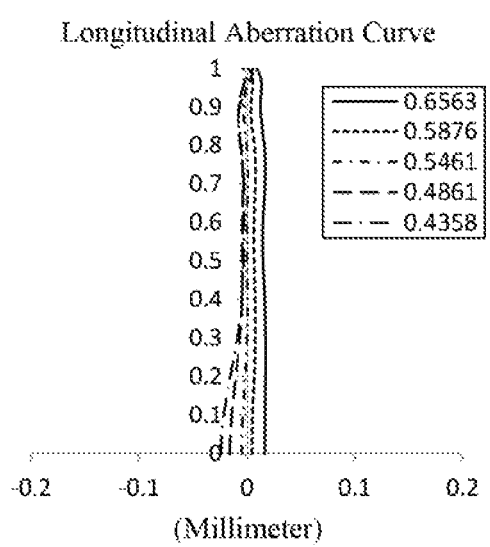
FIGS. 14A-14D illustrate a longitudinal aberration curve, an astigmatic curve, a distortion curve and a lateral color curve of the optical imaging lens assembly according to embodiment 7, respectively.
Figure 14B:
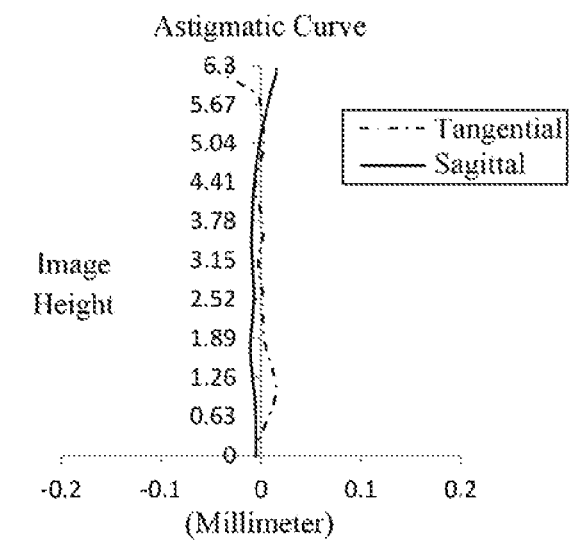
Figure 14C:
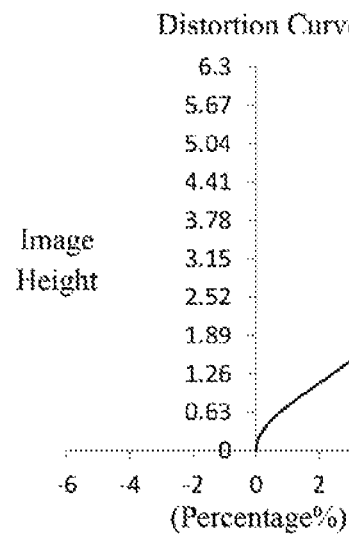
Figure 14D:
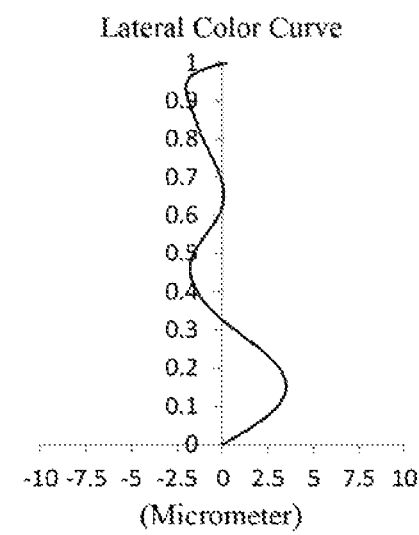

FIG. 14A illustrates a longitudinal aberration curve of the optical imaging lens assembly according to embodiment 7, light passes through the optical imaging lens assembly. It can be seen from FIG. 14A to FIG. 14D that the optical

Embodiment 8

Figure 15:
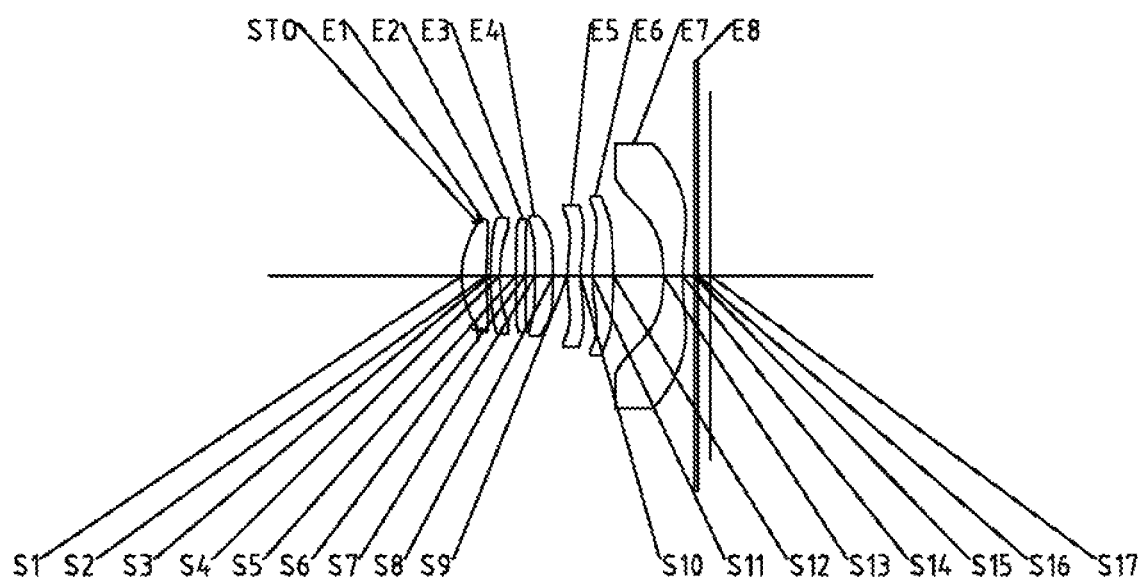
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a convex surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from the object sequentially passes through the respective surfaces S1 to S16 and is finally imaged on the imaging plane S17.

Table 15 is a table showing basic parameters of the optical imaging lens assembly in embodiment 8, wherein the units for the radius of curvature, the thickness and the focal length are millimeter (mm).

TABLE 15

| Lens number | Surface number | Surface type | Radius of curvature | Thickness | Material Refractive index | Abbe number | Conic coefficient | Focal length |
|---|---|---|---|---|---|---|---|---|
|  | OBJ | spherical | infinite | infinite |  |  |  |  |
|  | STO | spherical | infinite | −0.4990 |  |  |  |  |
| E1 | S1 | aspheric | 2.9841 | 0.8038 | 1.68 | 56.11 | −0.2886 | 6.41 |
|  | S2 | aspheric | 18.2182 | 0.1243 |  |  | −99.0000 |  |
| E2 | S3 | aspheric | 8.0529 | 0.3000 | 1.68 | 19.25 | −24.9015 | −15.16 |
|  | S4 | aspheric | 4.4510 | 0.5197 |  |  | −0.1899 |  |
| E3 | S5 | aspheric | 17.8139 | 0.3099 | 1.68 | 56.11 | 5.0000 | 148.84 |
|  | S6 | aspheric | 22.6691 | 0.3191 |  |  | −50.5516 |  |
| E4 | S7 | aspheric | −41.1823 | 0.5914 | 1.68 | 56.11 | 5.0000 | 40.04 |
|  | S8 | aspheric | −14.3610 | 0.4562 |  |  | 5.0000 |  |
| E5 | S9 | aspheric | 6.1906 | 0.4160 | 1.57 | 37.32 | −3.4797 | −21.83 |
|  | S10 | aspheric | 4.0357 | 0.3843 |  |  | −2.3965 |  |
| E6 | S11 | aspheric | 5.2526 | 0.6777 | 1.68 | 56.11 | 0.8880 | 6.84 |
|  | S12 | aspheric | −12.3613 | 1.6277 |  |  | −50.5712 |  |
| E7 | S13 | aspheric | −4.8735 | 0.6166 | 1.54 | 55.87 | −0.8249 | −6.20 |
|  | S14 | aspheric | 11.0121 | 0.3799 |  |  | 2.8083 |  |
| E8 | S15 | aspheric | infinite | 0.1100 | 1.52 | 64.17 |  |  |
|  | S16 | aspheric | infinite | 0.4000 |  |  |  |  |
|  | S17 | aspheric | infinite |  |  |  |  |  |

An effective focal length of the optical imaging lens assembly satisfies f=6.62 mm, a distance along the optical axis from the object-side surface S1 of the first lens E1 to the imaging plane S17 satisfies TTL=8.04 mm, half of the diagonal length of an effective pixel area on the imaging plane S17 satisfies ImgH=6.00 mm, half of a maximal field-of-view of the optical imaging lens assembly satisfies HFOV=40.78°, and a F number satisfies Fno=1.90.

Table 16 shows high-order coefficients applicable to each aspheric surface in embodiment 8, wherein the surface shape of each aspheric surface in embodiment 8 can be defined by the formula (1) given in the above embodiment 1.

TABLE 16

| Surface number | A4 | A6 | A8 | A10 | A12 |
|---|---|---|---|---|---|
| S1 | 5.8672E−04 | 1.1722E−03 | −2.5558E−03 | 2.8605E−03 | −2.1329E−03 |
| S2 | −8.3315E−03 | 3.0216E−03 | 1.0924E−04 | −9.8459E−04 | 5.0800E−04 |
| S3 | −1.2695E−02 | 4.9130E−03 | 2.8595E−03 | −4.4605E−03 | 3.1424E−03 |
| S4 | −1.0719E−02 | 4.6453E−03 | −1.7483E−03 | 3.5679E−03 | −4.5982E−03 |

TABLE 16-continued

| | | | | | |
|---|---|---|---|---|---|
| S5  | −9.2983E−03 | 1.0177E−03  | −1.3307E−02 | 2.3383E−02  | −2.1280E−02 |
| S6  | −4.6581E−03 | −9.9837E−03 | 7.1687E−03  | −3.5097E−03 | 2.0673E−03  |
| S7  | −4.1773E−03 | −1.4083E−02 | 7.3044E−03  | −3.1092E−03 | 8.0040E−04  |
| S8  | −6.9652E−03 | −8.8886E−03 | −1.6726E−04 | 3.4830E−03  | −2.9320E−03 |
| S9  | −2.8235E−02 | 1.7962E−03  | 1.1967E−03  | −6.6587E−04 | −5.7306E−05 |
| S10 | −3.7301E−02 | −1.3542E−03 | 4.8639E−03  | −2.1588E−03 | 4.7503E−04  |
| S11 | 1.1773E−03  | −1.0807E−02 | 1.1783E−03  | 4.1304E−04  | −1.5634E−04 |
| S12 | 1.8796E−02  | −6.6644E−03 | −1.6369E−03 | 1.0800E−03  | −2.2724E−04 |
| S13 | 1.1104E−02  | −1.7411E−02 | 4.5775E−03  | −5.8894E−03 | 4.5412E−05  |
| S14 | 1.7497E−02  | −1.2533E−02 | 2.7623E−03  | −3.5153E−04 | 2.8442E−05  |

| Surface number | A14 | A16 | A18 | A20 |
|---|---|---|---|---|
| S1  | 1.0120E−03  | −3.0128E−04 | 5.0686E−05  | −3.7230E−06 |
| S2  | −1.0129E−04 | −1.1759E−05 | 8.5634E−06  | −1.1182E−06 |
| S3  | −1.3601E−03 | 3.7352E−04  | −5.8991E−05 | 3.9962E−06  |
| S4  | 3.3742E−03  | −1.3962E−03 | 3.1300E−04  | −2.9533E−05 |
| S5  | 1.1590E−02  | −3.6806E−02 | 6.3286E−04  | −4.5877E−05 |
| S6  | −1.0803E−03 | 4.4109E−04  | −9.9663E−05 | 8.6585E−06  |
| S7  | 7.8880E−05  | 1.1871E−04  | 3.3512E−05  | −3.3092E−06 |
| S8  | 1.2866E−03  | −3.1857E−04 | 4.1672E−05  | −2.2155E−06 |
| S9  | 1.0021E−04  | −2.5184E−05 | 2.6360E−06  | −1.0228E−07 |
| S10 | −5.6339E−05 | 3.5236E−06  | −9.9216E−08 | 6.3011E−10  |
| S11 | 2.2823E−05  | −1.7135E−06 | 6.5341E−08  | −1.0032E−09 |
| S12 | 2.5704E−05  | −1.6747E−06 | 5.9185E−08  | −8.7825E−10 |
| S13 | −2.2151E−06 | 6.7316E−08  | −1.1660E−09 | 8.7923E−12  |
| S14 | −1.4833E−06 | 4.8215E−08  | −8.8665E−10 | 7.0345E−12  |

Figure 16A:
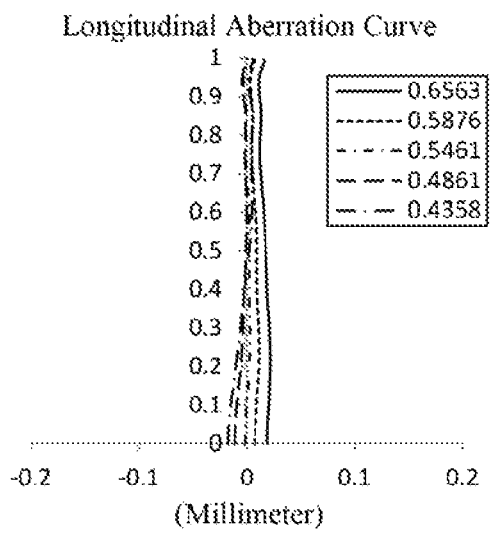
FIGS. 16A-16D illustrate a longitudinal aberration curve, an astigmatic curve, a distortion curve and a lateral color curve of the optical imaging lens assembly according to embodiment 8, respectively.
Figure 16B:
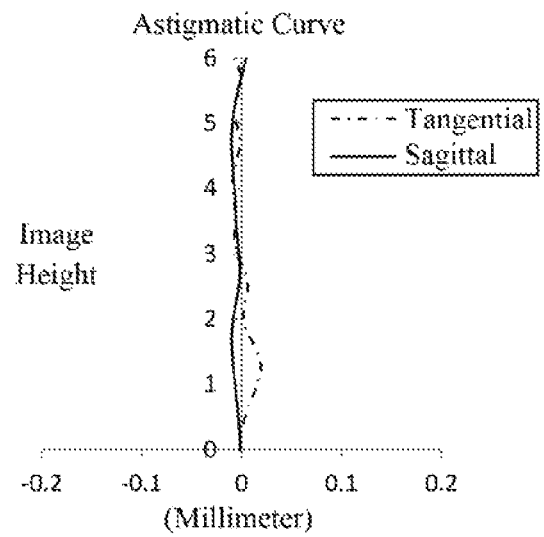
Figure 16C:
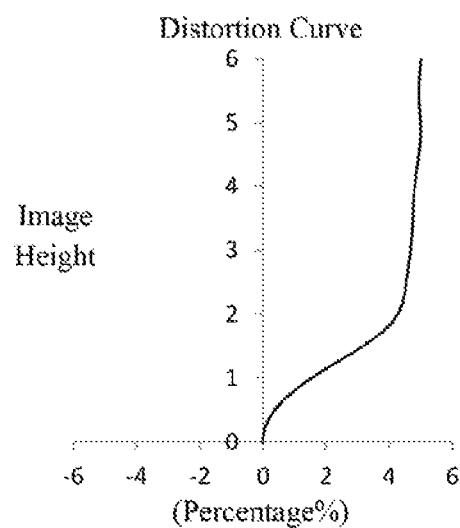
Figure 16D:
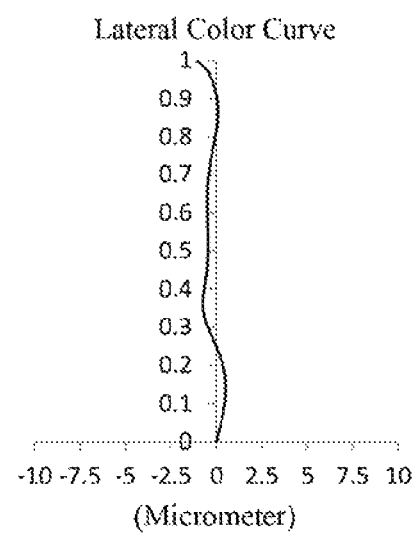

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion corresponding to different field-of-view angles. FIG. 16D illustrates a lateral color curve of the optical imaging lens assembly according to embodiment 8, representing deviations of different image heights on an imaging plane after light passes through the optical imaging lens assembly. It can be seen from FIG. 16A to FIG. 16D that the optical imaging lens assembly provided in embodiment 8 can achieve a good imaging quality.

In view of the above, embodiments 1 to 8 respectively satisfy the relationship shown in Table 17.

TABLE 17

| | Embodiment | | | | | | | |
|---|---|---|---|---|---|---|---|---|
| Conditional | 1 | 2 | 3 | 4 | 5 | 6 | 7 | 8 |
| tan(HFOV)*f(mm) | 5.95 | 6.08 | 6.11 | 5.71 | 6.04 | 5.91 | 5.94 | 5.71 |
| R10/R14 | 0.43 | 0.65 | 1.00 | 0.43 | 0.20 | 0.32 | 0.40 | 0.37 |
| TTL/ImgH | 1.30 | 1.21 | 1.21 | 1.35 | 1.32 | 1.27 | 1.32 | 1.34 |
| \|f1/f2\| | 0.40 | 0.53 | 0.42 | 0.40 | 0.40 | 0.42 | 0.30 | 0.42 |
| (R1 + R4)/f | 0.93 | 1.06 | 1.06 | 0.93 | 1.16 | 1.09 | 1.12 | 1.12 |
| R11/R9 | 0.52 | 0.43 | 0.30 | 0.52 | 0.97 | 0.60 | 0.39 | 0.85 |
| DT31/DT71 | 0.31 | 0.44 | 0.35 | 0.54 | 0.44 | 0.46 | 0.40 | 0.58 |
| f/f12 | 0.79 | 0.76 | 0.88 | 0.71 | 0.53 | 0.65 | 0.49 | 0.67 |
| CT2/(CT1 + CT3) | 0.23 | 0.21 | 0.22 | 0.23 | 0.31 | 0.28 | 0.44 | 0.27 |
| T56/T45 | 0.43 | 0.95 | 0.83 | 0.43 | 0.95 | 0.50 | 0.56 | 0.84 |
| TTL/ΣCT | 1.91 | 1.90 | 1.90 | 1.91 | 1.96 | 2.07 | 1.94 | 2.16 |
| SAG51 (mm) | −0.57 | −0.26 | −0.25 | −0.57 | −0.91 | −0.46 | −0.42 | −0.47 |
| SAG72 (mm) | −1.46 | −1.42 | −1.54 | −1.37 | −1.06 | −1.34 | −1.76 | −1.57 |

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising, sequentially from an object side to an image side of the optical imaging lens assembly along an optical axis:
   a first lens, having a positive refractive power;
   a second lens, having a refractive power;
   a third lens, having a refractive power;
   a fourth lens, having a refractive power;
   a fifth lens, having a refractive power, and an image-side surface of the fifth lens being a concave surface;

a sixth lens, having a refractive power; and a seventh lens, having a negative refractive power, wherein an effective focal length f of the optical imaging lens assembly and half of a maximal field-of-view angle HFOV of the optical imaging lens assembly satisfy 5.5 mm<tan(HFOV)*f≤6.11 mm.

2. The optical imaging lens assembly according to claim 1, wherein a distance TTL along the optical axis from an object-side surface of the first lens to an imaging plane of the optical imaging lens assembly and half of a diagonal length ImgH of an effective pixel area on the imaging plane of the optical imaging lens assembly satisfy TTL/ImgH<1.5.

3. The optical imaging lens assembly according to claim 1, wherein the effective focal length f of the optical imaging lens assembly and an entrance pupil diameter EPD of the optical imaging lens assembly satisfy f/EPD<2.

4. The optical imaging lens assembly according to claim 1, wherein a maximum effective radius DT31 of an object-side surface of the third lens and a maximum effective radius DT71 of an object-side surface of the seventh lens satisfy 0<DT31/DT71<0.8.

5. The optical imaging lens assembly according to claim 1, wherein the effective focal length f of the optical imaging lens assembly and a combined focal length f12 of the first lens and a second lens satisfy 0.2<f/f12<1.

6. The optical imaging lens assembly according to claim 1, wherein a radius of curvature R9 of an object-side surface of the fifth lens and a radius of curvature R11 of an object-side surface of the sixth lens satisfy 0<R11/R9≤0.97.

7. The optical imaging lens assembly according to claim 1, wherein the effective focal length f of the optical imaging lens assembly, a radius of curvature R1 of an object-side surface of the first lens and a radius of curvature R4 of an image-side surface of the second lens satisfy 0.7<(R1+R4)/f<1.4.

8. The optical imaging lens assembly according to claim 1, wherein an effective focal length f1 of the first lens and an effective focal length f2 of the second lens satisfy 0<|f1/f2|<0.8.

9. The optical imaging lens assembly according to claim 1, wherein a distance TTL along the optical axis from an object-side surface of the first lens to an imaging plane of the optical imaging lens assembly and a sum ΣCT of central thicknesses of the first lens to the seventh lens satisfy 1.6<TTL/ΣCT<2.4.

10. The optical imaging lens assembly according to claim 1, wherein a radius of curvature R10 of the image-side surface of the fifth lens and a radius of curvature R14 of an image-side surface of the seventh lens satisfy 0<R10/R14≤1.

11. An optical imaging lens assembly comprising, sequentially from an object side to an image side of the optical imaging lens assembly along an optical axis:

a first lens, having a positive refractive power;

a second lens, having a refractive power;

a third lens, having a refractive power;

a fourth lens, having a refractive power;

a fifth lens, having a refractive power, and an image-side surface of the fifth lens being a concave surface;

a sixth lens, having a refractive power; and a seventh lens, having a negative refractive power, wherein a distance SAG51 along the optical axis from an intersection of an object-side surface of the fifth lens and the optical axis to an effective radius vertex of the object-side surface of the fifth lens satisfy −1 mm<SAG51<0, and wherein an effective focal length f1 of the first lens and an effective focal length f2 of the second lens satisfy 0<|f1/f2|<0.8.

12. The optical imaging lens assembly according to claim 11, wherein a distance TTL along the optical axis front an object-side surface of live first lens to an imaging plane of the optical imaging lens assembly and half of a diagonal length ImgH of an effective pixel area on the imaging plane of the optical imaging lens assembly satisfy TTL/ImgH<1.5.

13. The optical imaging lens assembly according to claim 11, wherein an effective focal length f of the optical imaging lens assembly and an entrance pupil diameter EPD of the optical imaging lens assembly satisfy f/EPD<2.

14. The optical imaging lens assembly according to claim 11, wherein an air interval T45 along the optical axis between the fourth lens and the fifth lens and an air interval T56 along the optical axis between the fifth lens and the sixth lens satisfy 0.1<T56/T45≤0.95.

15. The optical imaging lens assembly according to claim 11, wherein a central thickness CT1 of the first lens along the optical axis, a central thickness CT2 of the second lens along the optical axis and a central thickness CT3 of the third lens along the optical axis satisfy 0<CT2/(CT1+CT3)<0.6.

16. The optical imaging lens assembly according to claim 11, wherein an effective focal length f of the optical imaging lens assembly and a combined focal length f12 of the first lens and a second lens satisfy 0.2<f/f12<1.

17. The optical imaging lens assembly according to claim 11, wherein an effective focal length f of the optical imaging lens assembly, a radius of curvature R1 of an object-side surface of the first lens and a radius of curvature R4 of an image-side surface of the second lens satisfy 0.7<(R1+R4)/f<1.4.

18. The optical imaging lens assembly according to claim 11, wherein a distance TTL along the optical axis from an object-side surface of the first lens to an imaging plane of the optical imaging lens assembly and a sum ΣCT of central thicknesses of the first lens to the seventh lens satisfy 1.6<TTL/ΣCT<2.4.

19. The optical imaging lens assembly according to claim 11, wherein a distance SAG72 along the optical axis from an intersection of an image-side surface of the seventh lens and the optical axis to an effective radius vertex of the image-side surface of the seventh lens satisfy −2 mm<SAG72≤−1.06 mm.

* * * * *